(12) United States Patent
Gordon et al.

(10) Patent No.: US 7,381,923 B2
(45) Date of Patent: Jun. 3, 2008

(54) CONSUMABLE ELECTRODE ARC WELDING

(75) Inventors: Thomas William Gordon, Kapunda (AU); Bernard Bednarz, Ottoway (AU); Mark Kevin Neller, Alberton (AU); Michael Peter Fanning, Moana (AU); Srinivasarao Lathabai, Oakden (AU)

(73) Assignee: Migfast Pty Ltd, Wheelers Hill, Victoria (AU)

( * ) Notice: Subject to any disclaimer, the term of this patent is extended or adjusted under 35 U.S.C. 154(b) by 235 days.

(21) Appl. No.: 10/833,297

(22) Filed: Apr. 27, 2004

(65) Prior Publication Data

US 2006/0151453 A1    Jul. 13, 2006

Related U.S. Application Data

(63) Continuation of application No. PCT/AU02/01510, filed on Nov. 6, 2002.

(30) Foreign Application Priority Data

| Nov. 7, 2001 | (AU) | ..................................... PR8721 |
| Mar. 19, 2002 | (AU) | ..................................... PS1191 |
| Jul. 8, 2002 | (AU) | ............................... 2002950101 |

(51) Int. Cl.
*B23K 9/28*    (2006.01)
(52) U.S. Cl. ................................................. 219/137.61
(58) Field of Classification Search ........... 219/137.52, 219/137.61
See application file for complete search history.

(56) References Cited

U.S. PATENT DOCUMENTS

| 1,233,434 A | 7/1917 | Zuck |
| 2,289,938 A | 7/1942 | Smith |
| 2,379,470 A | 7/1945 | Baird |
| 2,428,849 A | 10/1947 | Kratz et al. |
| 2,666,832 A | 1/1954 | Landis et al. |
| 2,679,571 A | 5/1954 | Chappel |

(Continued)

FOREIGN PATENT DOCUMENTS

DE    33 09 901    9/1984

(Continued)

OTHER PUBLICATIONS

English Abstract of WO 97/40956 dated Nov. 6, 1997.

(Continued)

*Primary Examiner*—Kevin P Kerns
(74) *Attorney, Agent, or Firm*—Ladas & Parry LLP

(57) ABSTRACT

A contact tip suitable for electric arc welding has a consumable electrode. The contact tip has a body which defines a bore through which the electrode is able to pass to enable electric current from a welding power supply to be transferred from the body to the electrode. The body, in part of the length of the bore between an inlet end and an outlet end, has at least one region (herein referred to as a primary contact region) at which the body is adapted to enable primary electrical contact with the electrode, and along a remainder part of the length of the bore, the body is adapted such that any secondary contact between the body and the electrode along the remainder part does not substantially short circuit the primary electrical contact in the primary contact region of the bore.

33 Claims, 12 Drawing Sheets

U.S. PATENT DOCUMENTS

| | | | |
|---|---|---|---|
| 2,735,920 A | 2/1956 | Valliere | |
| 2,754,395 A | 7/1956 | Scheller et al. | |
| 2,761,049 A | 8/1956 | McElrath et al. | |
| 2,778,910 A | 1/1957 | Landis et al. | |
| 2,810,063 A | 10/1957 | Brashear, Jr. | |
| 2,866,079 A | 12/1958 | Morley, Jr. et al. | |
| 2,903,567 A | 9/1959 | Piekarski et al. | |
| 2,957,101 A | 10/1960 | Barkley | |
| 2,965,746 A | 12/1960 | Cresswell | |
| 3,025,387 A | 3/1962 | Kinney | |
| 3,089,022 A | 5/1963 | Kinney | |
| 3,103,576 A | 9/1963 | Miller | |
| 3,116,408 A | 12/1963 | Turbett et al. | |
| 3,309,491 A | 3/1967 | Jacobs | |
| 3,366,774 A | 1/1968 | Nuss et al. | |
| 3,469,070 A | 9/1969 | Bernard et al. | |
| 3,470,349 A | 9/1969 | Sievers | |
| 3,488,468 A | 1/1970 | Carbone | |
| 3,514,570 A | 5/1970 | Bernard et al. | |
| 3,529,128 A | 9/1970 | Cruz, Jr. | |
| 3,536,888 A | 10/1970 | Borneman | |
| 3,576,423 A | 4/1971 | Beecher et al. | |
| 3,585,352 A | 6/1971 | Zvanut | |
| 3,590,212 A | 6/1971 | Corrigall et al. | |
| 3,596,049 A | 7/1971 | Ogden | |
| 3,597,576 A | 8/1971 | Beecher et al. | |
| 3,617,688 A | 11/1971 | Fogelstrom | |
| 3,676,640 A | 7/1972 | Bernard et al. | |
| 3,697,721 A | 10/1972 | Robba et al. | |
| 3,716,902 A | 2/1973 | Pearce | |
| 3,783,233 A | 1/1974 | Molin | |
| 3,825,719 A | 7/1974 | Jonsson | |
| 3,878,354 A | 4/1975 | Frantzreb, Sr. | |
| 4,258,242 A | 3/1981 | Fujimori et al. | |
| 4,309,590 A | 1/1982 | Stol | |
| 4,361,747 A | 11/1982 | Torrani | |
| 4,482,797 A | 11/1984 | Shiramizu et al. | |
| 4,560,858 A | 12/1985 | Manning | |
| 4,575,612 A | 3/1986 | Prunier | |
| 4,672,163 A | 6/1987 | Matsui et al. | |
| 4,937,428 A | 6/1990 | Yoshinaka et al. | |
| 4,947,024 A | 8/1990 | Anderson | |
| 4,956,541 A | 9/1990 | Hiltunen | |
| 5,101,093 A | 3/1992 | Matsui et al. | |
| 5,192,852 A | 3/1993 | Pike | |
| 5,278,392 A | 1/1994 | Takacs | |
| 5,288,972 A | 2/1994 | Wujek | |
| 5,319,175 A | 6/1994 | Truty | |
| 5,352,523 A | 10/1994 | Zurecki et al. | |
| 5,556,562 A | 9/1996 | Sorenson | |
| 5,585,013 A | 12/1996 | Truty | |
| 5,618,456 A | 4/1997 | Kim | |
| 5,635,091 A | 6/1997 | Hori et al. | |
| 5,721,417 A | 2/1998 | Craig | |
| 5,726,420 A | 3/1998 | Lajoie | |
| 6,093,907 A * | 7/2000 | Hidaka | 219/137.61 |
| 6,130,407 A | 10/2000 | Villafuerte | |
| 6,429,406 B1 | 8/2002 | Sattler | |
| 6,559,416 B1 | 5/2003 | Steenis et al. | |
| 6,943,318 B2 * | 9/2005 | Takagi et al. | 219/137.61 |
| 2003/0019857 A1 | 1/2003 | Takagi et al. | |
| 2003/0029851 A1 | 2/2003 | Suzuki et al. | |

FOREIGN PATENT DOCUMENTS

| | | | |
|---|---|---|---|
| DE | 33 40 191 | * | 5/1985 |
| DE | 34 30 652 | | 3/1986 |
| DE | 42 17 995 | | 12/1993 |
| EP | 1 108 491 | | 6/2001 |
| EP | 1 266 714 | | 12/2002 |
| FR | 2 539 658 | | 7/1984 |
| FR | 2 565 141 | | 12/1985 |
| FR | 2 644 091 | | 9/1990 |
| GB | 2 170 133 | * | 7/1986 |
| JP | 63-40625 | | 2/1988 |
| JP | 63-80978 | | 4/1988 |
| JP | 63-154270 | * | 6/1988 |
| JP | 64-18582 | | 1/1989 |
| JP | 4-294870 | | 10/1992 |
| JP | 5-96376 | | 4/1993 |
| JP | 5-261551 | * | 10/1993 |
| JP | 5-269580 | | 10/1993 |
| JP | 6-2885645 | | 10/1994 |
| JP | 7-290247 | | 11/1995 |
| JP | 8-150479 | | 6/1996 |
| JP | 8-215855 | | 8/1996 |
| JP | 9-1346 | | 1/1997 |
| JP | 9-136165 | | 5/1997 |
| JP | 9-295151 | | 11/1997 |
| JP | 10-24373 | | 1/1998 |
| JP | 10-34341 | | 2/1998 |
| JP | 10-71471 | | 3/1998 |
| JP | 10-193124 | | 7/1998 |
| JP | 10-244371 | | 9/1998 |
| JP | 10-328836 | | 12/1998 |
| JP | 11-123559 | | 5/1999 |
| JP | 2000-61640 | | 2/2000 |
| JP | 2000-153360 | | 6/2000 |
| JP | 2001-18069 | | 1/2001 |
| JP | 2001-121265 | | 5/2001 |
| JP | 2001-121268 | | 5/2001 |
| JP | 2001-259844 | | 9/2001 |
| JP | 2001-300732 | | 10/2001 |
| JP | 2002-45969 | | 2/2002 |
| JP | 2002-144037 | | 5/2002 |
| JP | 2002-292469 | | 10/2002 |
| JP | 2003-1419 | | 1/2003 |
| JP | 2003-33877 | | 2/2003 |
| JP | 2003-112261 | | 4/2003 |
| WO | 97/40956 A1 | | 11/1997 |
| WO | WO97/40956 | * | 11/1997 |
| WO | 03/039801 | | 5/2003 |
| WO | 03/039802 | | 5/2003 |

OTHER PUBLICATIONS

English Abstract of WO 03/039801 dated May 15, 2003.
English Abstract of WO 03/039802 dated May 15, 2003.
Patent Abstracts of Japan of JP 04-294870 dated Oct. 19, 1992.
Patent Abstracts of Japan of JP 05-096376 dated Apr. 20, 1993.
Patent Abstracts of Japan of JP 05-261551 dated Oct. 12, 1993.
Patent Abstracts of Japan of JP 05-269580 dated Oct. 19, 1993.
Patent Abstracts of Japan of JP06-285645 dated Oct. 11, 1994.
Patent Abstracts of Japan of JP 07-290247 dated Nov. 7, 1995.
Patent Abstracts of Japan of JP 08-150479 dated Jun. 11, 1996.
Patent Abstracts of Japan of JP 09-295151 dated Nov. 18, 1997.
Patent Abstracts of Japan of JP 10-193124 dated Jul. 28, 1998.
Patent Abstracts of Japan of JP 10-244371 dated Sep. 14, 1998.
Patent Abstracts of Japan of JP 2001-121265 dated May 8, 2001.
Patent Abstracts of Japan of JP 2001-259844 dated Sep. 25, 2001.
Patent Abstracts of Japan of JP 2001-300732 dated Oct. 30, 2001.
Patent Abstracts of Japan of JP 2002-292469 dated Oct. 8, 2002.
Patent Abstracts of Japan of JP 2003-001419 dated Jan. 8, 2003.
Patent Abstracts of Japan of JP 2003-033877 dated Feb. 4, 2003.
Patent Abstracts of Japan of JP 2003-112261 dated Apr. 15, 2003.
Patent Abstracts of Japan JP 2001-121268 A Published May 8, 2001.
Patent Abstracts of Japan JP 2002-144037 A Published May 21, 2002.
English Abstract of JP 63-40625 dated Feb. 22, 1988.
English Abstract of JP 63-80978 dated Apr. 11, 1988.
English Abstract of JP 64-18582 dated Jan. 23, 1989.
English Abstract of JP 8-215855 dated Aug. 27, 1996.
English Abstract of JP 9-1346 dated Jan. 7, 1997.
English Abstract of JP 9-136165 dated May 27, 1997.

English Abstract of JP 10-24373 dated Jan. 27, 1998.
English Abstract of JP 10-34341 dated Feb. 10, 1998.
English Abstract of JP 10-71471 dated Mar. 17, 1998.
English Abstract of JP 10-328836 dated Dec. 15, 1998.
English Abstract of JP 2000-61640 dated Feb. 29, 2000.
English Abstract of JP 2000-153360 dated Jun. 6, 2000.
English Abstract of JP 2001-18069 dated Jan. 23, 2001.
English Abstract of JP 2002-45969 dated Oct. 15, 2001.
English Abstract of JP 4-294870 dated Oct. 19, 1992.
English Abstract of JP 5-96376 dated Apr. 20, 1993.
English Abstract of JP 5-261551 dated Oct. 12, 1993.
English Abstract of JP 5-269580 dated Oct. 19, 1993.
English Abstract of JP 6-285645 dated Oct. 11, 1994.
English Abstract of JP 7-290247 dated Nov. 7, 1995.
English Abstract of JP 8-150479 dated Jun. 11, 1996.
English Abstract of JP 9-295151 dated Nov. 18, 1997.
English Abstract of JP 10-193124 dated Jul. 28, 1998.
English Abstract of JP 10-244371 dated Sep. 14, 1998.
English Abstract of JP 2001-121265 dated May 8, 2001.
English Abstract of JP 2001-300732 dated Oct. 30, 2001.
English Abstract of JP 2001-259844 dated Sep. 25, 2001.
English Abstract of JP 2002-292469 dated Oct. 8, 2002.
English Abstract of JP 2003-1419 dated Jan. 8, 2003.
English Abstract of JP 2003-33877 dated Feb. 4, 2003.
English Abstract of JP 2003-112261 dated Apr. 15, 2003.
Villafuerte, J. "Understanding Contact Tip Longevity for Gas Metal Arc Welding" *Welding Journal* (1999) p. 29-35.
Shimizu, H. et al. "Feedability of Wires During Metal Active Gas Welding" *Science and Technology of Welding and Joining* (2006) vol. 11, No. 1, pp. 81-92.
Yamada, T. et al. "Fluctuation of the Wire Feed Rate in Gas Metal Arc Welding" *Welding Journal* (1987) p. 35-42.
Babu, S.S. et al. "Empirical Model of Effects of Pressure and Temperature on Electrical Contact Resistance of Metals" *Science and Technology of Welding and Joining* (2001) vol. 6, No. 3, pp. 126-132.
MacGillycuddy, A. de C., Declaration of English translation and translation of Yamada JP 5-261551 of Oct. 1993.
esp@cenet Abstract of FR 2 565 141 OF Dec. 1985.
esp@cenet Abstract of JP 11-123559 OF May 1999.

* cited by examiner

CONSUMABLE ELECTRODE ARC WELDING

This application is a continuation of copending International Application PCT/AU02/01510 filed on 6 Nov. 2002, which designated the U.S., claims the benefit thereof and incorporates the same by reference.

FIELD OF THE INVENTION

This invention relates to improvements in electric arc welding equipment operable with a consumable electrode.

BACKGROUND TO THE INVENTION

Many forms of electric arc welding with a consumable electrode use welding guns which have a contact tip, sometimes referred to as a contact tube or electrical contact tube or tip. These forms of welding include gas metal arc welding (GMAW), sometimes referred to as metal inert gas (MIG) welding, as well as submerged arc welding (SAW) and flux cored arc welding (FCAW).

The contact tip is a critical element in welding guns for electric arc welding with a consumable electrode. Its main function is to enable electric current from a welding power supply to be continuously transported to a wire or strip comprising the consumable electrode. Contact tips are made of metal, almost exclusively of copper or a copper alloy, because of the high electrical and thermal conductivity of these metals. Usually contact tips are of hard drawn copper of high purity, or of an alloy such as Cu-2% Be, Cu-0.5% Be and suitable Cu—Cr—Zr alloys.

There is extensive prior art in relation to arc welding equipment, including contact tips. Examples include journal articles such as:

"Fluctuations of the Wire Feed Rate in Gas Metal Arc Welding" by Yamada et al, Welding Journal, September 1987, pp. 35 to 42;

"Understanding Contact Tips Longevity for Gas Metal Arc Welding" by Villafuerte, Welding Journal, December 1999, pp. 29 to 35;

"The Physics of Welding" by J. F. Lancaster, 2nd Ed., Permagen Press, 1986;

"Advanced Welding Processes" by J. Norrish, IOP Publishing Ltd., 1992; and

"Heat Effects of Welding" by D. Radaj, Springer Verlag, 1992.

Further examples are provided by patent literature including GB-2074069 to Folke et al (ESAB Limited); GB-2170133 to Cooke (R. E. Cooke & Sons (Burton) Ltd.; DE 4006138 by Lange; WO98/12011 by Davis; and the following United States patent specifications:

1233434 to Zuck
2289938 to Smith
2379470 to Baird
2428849 to Kratz et al
2666832 to Landis et al
2679571 to Chappel
2735920 to Valliere
2754395 to Scheller et al
2761049 to McElrath et al
2778910 to Landis et al
2810063 to Brashear Jr.
2866079 to Morley et al
2903567 to Piekarski et al
2957101 to Barkley
2965746 to Cresswell
3025387 to Kinney
3089022 to Kinney
3103576 to Miller
3309491 to Jacobs
3366774 to Nuss et al
3469070 to Bernard et al
3470349 to Sievers
3488468 to Carbone
3514570 to Bernard et al
3529128 to Cruz Jr.
3536888 to Borneman
3576423 to Bernard et al
3585352 to Zvanut
3590212 to Corrigall et al
3596049 to Ogden
3597576 to Bernard et al
3617688 to Fogelstrom
3676640 to Bernard et al
3697721 to Robba et al
3716902 to Pearce
3783233 to dal Molin
3825719 to Jonsson
3878354 to Frantzreb Sr.
4258242 to Fujimori et al
4309590 to Stol
4361747 to Torrani
4560858 to Manning
4575612 to Prunier
4672163 to Matsui et al
4937428 to Yoshinaka et al
4947024 to Anderson
5101093 to Matsui et al
5192852 to Pike
5278392 to Takacs
5288972 to Wujek
5352523 to Zurecki et al
5556562 to Sorenson
5618456 to Kim
5635091 to Hori et al
5721417 to Craig
5726420 to Lajoie
6093907 to Hidaka
6130407 to Villafuete
6429406 to Sattler.

The principal issues affecting productivity in GMAW are heat input and deposition rate (hence wire melting rate). Heat input is proportional to welding voltage and current and inversely proportional to the travel speed of the welding torch relative to a work piece being welded. The welding torch may be held stationary and the work piece moved relative to the torch, the work piece may be held stationary and the torch moved relative to the work piece, or each of the torch and work piece may move but with relative movement therebetween. Heat input affects weld penetration, cooling time, weld distortion and metallurgical properties in deposited weld metal and/or in adjacent zones of the work piece. In general, it is advantageous to minimise heat input for a given deposition rate.

For a given contact tip of a welding torch, it is possible to establish a theoretical upper limit for the melting rate for a wire used as a consumable electrode, and also a theoretical lower limit for the melting rate of the wire. The principles can be detailed by reference to an established formula for wire deposition rate for GMAW. The above-mentioned text by Norrish presents a formula for wire melting rate. An equivalent algebraic representation may be expressed by the formula:

$$W = aI + bLI^2$$

where:

"W" is the wire feed rate (usually expressed in metres per minute),

"I" is the welding current in amperes,

"a" is a coefficient representing heating of the wire by the welding arc,

"b" is a coefficient for resistive heating of the wire, and

"L" is the relevant length of the wire subjected to resistive heating.

The parameters "a" and "b" depend on the wire diameter (in the case of wire of circular cross-section, or equivalent diameter for wire of other cross-sections) and also on the wire composition. These parameters may be derived for each consumable from measured or published data for deposition rate or wire feed speed.

For simplicity, but without loss of generality in use of the above-indicated formula, welding in the down hand position is assumed. There are essentially two mechanisms responsible for melting wire consumables in GMAW. The first is heating of the wire by the electric arc established between the end of the wire and the surface top of a weldpool. In the formula, this arc-related mechanism is represented by the term "aI". The second mechanism is resistive heating of the wire by the current established in the wire after the wire makes electrical contact with the contact tip, and this resistive-related mechanism is represented by the term "$bLI^2$".

The parameter "L" in the above-indicated formula represents the length of the wire between the effective contact point of the wire in the contact tip and the top of the welding arc. This length of the wire differs from the normal use of the parameter L, in which that length is taken as the length of wire exposed beyond the outlet end of the contact tip to the top of the welding arc.

In relation to the resistive heating, the interpretation of L in normal use, i.e. the electrode extension or stick-out, cannot be relied on. It can be appropriate where the wire makes electrical contact with the contact tip at the outlet end of the bore of the contact tip. In such case, the interpretation corresponds to that for the above-indicated formula, at least where there is a single contact point between the wire and the contact tip. However, where there is a single contact point, this can be at any location along the contact tip bore, from the inlet end to the outlet end of the bore. Also, the location can vary between those extremes during a welding operation, and further variation can result from there intermittently being at least two contact points along the length of the bore. It is usual for the length of the bore to be greater than the electrode extension or stick-out and, as a consequence, there can be variability of in excess of 100% in the actual length of the wire subjected to resistive heating; both between successive welding operations and during a given welding operation. That is, there can be variability in excess of 100% in the value of L for the purpose of the above-indicated formula as compared with a measure of L to determine electrode extension or stick-out.

Where the actual length of the wire subjected to resistive heating varies, whether between successive welding operations or during a single welding operation, there can be a substantial variation, in the required welding current at a given wire feed rate. As a result, instantaneous heat input can vary substantially, with adverse consequences for welding performance.

The principles as described above for wire melting rate apply to GMAW carried out with welding power supplies operating under essentially constant voltage conditions. In order to control the mode of droplet transfer by electronic means, pulsed power supplies are also used for GMAW. Pulses of electric current are applied to heat the wire consumable and to induce droplet detachment. The relation between wire melting rate and current is more complex than the relation given in the equation presented previously. Nevertheless there is a strong dependence of wire melting rate on preheat length and it is critical to performance to maintain a continuous current delivery area within the tip.

The second issue related to the performance of a tip is the feedability of the wire through the tip. The reproducibility with time of the processes associated with droplet transfer process requires that a uniform wire feed speed be established and maintained. One of the objectives of this invention is to enable reliable welds to be deposited at wire feed speeds substantially in excess of those possible with conventional GMAW. The feed force must therefore be as low as practicable so that the mechanical work applied to the tip is reduced. Mechanical work results in wear. Wear creates problems in the electrical contact area and ultimately leads to tip failure and defects in the weld.

SUMMARY OF THE INVENTION

The present invention seeks to provide a contact tip which enables improved control over electrical contact with a consumable electrode wire and which, as a consequence, enables welding under more stable operating conditions for non pulsed and pulsed power supplies. The invention addresses fundamental physical issues of wire feedability and continuous current delivery and, as such the invention can enable enhancement of the performance of a wide variety of welding power supplies designed for GMAW.

According to the present invention, there is provided a contact tip suitable for electric arc welding using a consumable electrode, wherein the contact tip has a body which defines a bore through which the electrode is able to pass, to enable electric current from a welding power supply to be transferred from the body to the electrode. Within a part of the length of the bore between an inlet end and an outlet end thereof, there is at least one region (hereinafter referred to as the primary contact region) at which the body is adapted to enable primary electrical contact with the electrode. Along the remainder part of the length of the bore, the body is adapted such that, in the event of any secondary contact between the body and the electrode along the remainder of the bore, the secondary contact does not substantially short circuit the primary electrical contact in the primary contact region of the bore.

The primary electrical contact is such that it enables sufficient welding power supply to the electrode for efficient welding. The primary contact region of the bore, in which the body is adapted to enable that primary contact, most preferably is a minor part of the length of the bore, such as less than about 10% of that length. The minor part may be less than about 5% of the length of the bore. In any event, the primary contact region preferably is not more than about 5 mm in length, such as less than about 3 mm. This is a particularly important feature of the invention. Since the primary contact region is small relative to that in conventional tips and also in devices described in prior art, feed force is low and the path of the wire through the tip is relatively unobstructed. This enables continuous electrical contact between wire and tip to be established and maintained even at high wire feed speeds.

The primary contact region of the bore most preferably is at or close to the inlet end of the bore. In this regard, reference to the bore is intended to denote the passage in which electrical contact is intended to be made, as distinct from a tapered guide leading to the inlet end of the passage or bore and intended for guiding the leading end of an electrode into the passage or bore.

While the primary contact region most preferably is at or close to the inlet end of the bore, the region may be further along the bore. Thus, the region may be intermediate of the inlet and outlet ends of the bore or, in an extreme case, it may be at or close to the outlet end.

One benefit of having the primary contact region at or close to the inlet end of the bore is that it facilitates establishment of a suitable preheat length L of electrode. However, if the region is further along the bore, a sufficient suitable preheat length L still is able to able attained in at least some instances. This most clearly is so with a welding torch designed for use with a specific contact tip. The sufficient suitable preheat length is able to be attained by providing a contact tip extension tube which is fitted to provide an extension of the contact tip beyond the outlet end.

The primary electrical contact may be made in a number of different ways. In a first way, the bore is configured such that the consumable wire electrode, in passing through the bore, beds into the surface defining the primary contact region of the bore. The bore can be configured to provide a slight step in the bore, at the end of the primary contact region nearer to the inlet end of the contact tip whereby that region is of a slightly reduced diameter. With a suitable step, it is found that the electrode reliably beds into the surface defining the primary contact region to establish thereby a primary electrical contact. The contact is found to be free of arcing and able to be maintained through a welding run. The precise location of the primary contact area depends on the dimensions of the step and the stiffness and curvature of the wire.

The primary electrical contact achieved by configuring the bore by providing a step is surprising given the characteristics of welding with a conventional contact tip. In each case, there is relatively light sliding contact between the electrode wire and the conventional contact tip. However, with the conventional contact tip, the number and location of contacts can vary, with no one contact providing stable over-riding primary electrical contact and resultant freedom from arcing. In contrast, the presence of the bore configuring in the tip of the invention achieves stability and the contact location remains substantially longitudinally constant. Some circumferential sliding contact may occur in start up with the contact tip of the invention, but this quickly is overcome by the electrode bedding into the surface defining the primary contact region.

Both with the contact tip of the invention with a configured bore, and with a conventional contact tip, curvature and springiness of the electrode wire appear to be plrincipal factors giving rise to the cdcotact between the wire and contact tip. While the contact is not reproducible with the conventional tip, it is reproducible with the tip of the invention. However, in each case required contact is able to be established with use of a similar cleerence for the wire in the bore. That is, the difference in diameter beween the wire and the bore is similar in each case, at least where required contact is able to bi established. Thus, in the contact tip of the invention, the step provided at the end of the primary contact region nearer to the inlet end of the tip is less than, e.g., may be about half the standard bore cleareance or tolerance for a given electrode wire in a conventional contact tip, i.e., a current supply clearance. The step may reduce the bore diameter from a standard clearnce to less than a standard clearance along the prmary contact region, or to a standard clearance from greater than a standard clearance. Thus, for example, for a 1.2 mm electrode wire for which a conventional tip would have a 1.3 mm bore diameter to give a 0.1 mm clearance, the tip of the invention may have a bore configured by a step which reduces the bore diameter from 1.3 mm to a diameter along the principal acontact region of 1.25 mm, or from 1.35 to a diameter along that regioon of 1.3 mm. As indicated by these figures, reference to a clearance herein between a bore and wire corresponds to the difference in their diameters.

The configuring of the bore may be by slight counter-boring from the inlet end of the contact tip. However, as an alternative to this, at least one insert may define a portion of the bore with the portion differing appropriately in diameter from an adjacent portion of the bore to provide the step. In each case, the step preferably is of substantially uniform annular form. That form may be such as to define an annular shoulder facing towards the inlet end and substantially perpendicular to the bore. Alternatively, the step may result from an annular bevel.

In another form, the contact tip is adapted to enable primary electrical contact with the electrode by being provided with contactiong means by which the electrode is held in sliding contact with a surface defining the bore at at least on location within the primary contact region of the length of the bore. The contacting means, at each such location, may comprise a pin, plunger, ball, screw or the like which is mounted in the body of the contact tip so as to project transversely into the bore. The contacting means, where comprising a pin, plunger, ball or the like, may be resiliently biased so as to projectinto the bore. Where comprising a screw or the like, the contacting means may be in screw-threaded engagement in the body, and able to be rotated so as to move axially and project into the bore. In each case, the contacting means may include a bearing pad, by which the pin, plunger, screw or the like contacts the electrode. The bearing pad may be of a wear resistant material, or a softer, low friction material. The bearing pad may be of an electrically conducting material such as graphite or of an electrically insulating material such as the fluoropolymer PTFE available under the trademark TEFLON.

Where the contact tip is provided with contacting means, it is preferred that the contacting means achieves principal electrical contact comparable in nature to that achieved by configuring the bore. That is, the contacting means is to bring about relatively light sliding contact between the wire and the surface defining the primary contact region of the bore. The contacting means is to avoid clamping the wire into firm contact with that surface and high wire feed speeds therefore are enabled, with even the thinnest wires, without undue friction and wear. Rather than provide undesirable clamping, the contacting means essentially is to locate contact between the wire and the tip. Thus, a contact tip according to the present invention can be suited to a full range of GMAW wire diameters, such as down to 0.8 mm wire and with some difficulty, down to 0.6 mm wire.

A number of different arrangements are possible with a contact tip according to the present invention for ensuring that a secondary contact, if any, does not short circuit the primary electrical contact. In a first arrangement, the contact tip is counter-bored over the remainder of its length such that secondary contact is substantially precluded. That is, while the contact tip bore, along the primary contact region, has a cross-section providing only a small clearance for an electrode with which tip is intended to be used, the bore along the remainder of its length may have a substantially larger cross-section. The electrode then is able to establish primary contact in the primary contact region, but is unable to make secondary contact with the contact tip outside that region. If required, the contact tip may be provided with a guide member which assists in precluding secondary contact. Thus where, for example, the primary contact region is at or close to the inlet end of the bore, with the tip counter-bored from the outlet end to that region, the contact tip may be provided with an insulating end fitting at the outlet end through which the electrode is able to pass. Such end fitting, which may for example be an end cap, preferably has an opening co-axial with the bore through which the electrode is able to extend. The end fitting assists in precluding secondary contact between the contact tip and the electrode, while it also is able to minimise undesired lateral movement of the electrode.

In a second arrangement, the electrode is able to make secondary contact. That is, the electrode is not precluded from contacting the contact tip in the remainder of the bore. However, in the second arrangement, the primary contact region establishes a preferred current flow path from the contact tip to the electrode, relative to a current flow path otherwise possible from the tip to the electrode at a location of secondary contact. The avoidance of short circuiting is able to be achieved by virtue of the preferred current flow path, and enables maintenance of a substantially constant electrode preheat length L. Importantly, secondary contact also enables avoidance of arcing due to a possibly brief interval in which there may be an open circuit in the primary contact region.

The contact tip may be made entirely of electrically conductive material. Despite this, short circuiting of the primary electrical contact is able to be avoided, despite secondary contact possible in the second arrangement. This is due to the primary contact having a lower level of contact resistance than results with the mere sliding nature of secondary contact, and giving rise to a preferred current flow path. That is, the primary contact resulting from configuring the bore at the inlet end of the primary contact region, or from contacting means provided at that region, is characterised by a lower level of contact resistance than the contact resistance resulting from sliding secondary contact in the remainder of the bore. For this, it is required that the remainder of the bore is relatively smooth by being free of any configuring which would decrease contact resistance.

In order to further increase contact resistance at any secondary contact, the bore may have a larger diameter in the remaining portion than in the primary contact region. Also, or alternatively, the primary contact region and the remainder of the bore may be defined by respective materials, with the material defining the remainder having a lower level of electrical conductivity than the material defining the primary zone or being electrically insulating.

Notwithstanding the above matters, avoidance of short circuiting is possible only while primary electrical contact is maintained. It therefore is preferred that, within the primary contact region of the bore, the body is adapted at each of at least two adjacent locations to enable primary electrical contact, as is possible where primary contact is by means of contacting means. Thus, if primary contact is lost at one location it is improbable, if possible at all, that it will be lost simultaneously at each location. Where there are two or more locations they generally will need to be axially spaced. However, in order for them to be adjacent, it also may be necessary that they also be angularly spaced around the bore. However, it is possible for locations to be angularly, but not longitudinally, spaced.

As indicated, the two or more locations may be longitudinally adjacent. If contact is lost at one, the electrode preheat length L will vary, but only slightly and to an extent which is of little consequence relative to a change resulting from short circuiting at a remote location. However, importantly, an open circuit condition will not occur simply as a result of contact being lost at one of two or more locations.

The arrangement of the contact tip of the present invention is such that there is substantially maximum, but substantially constant, resistive heating of the electrode. This is over a length L of the electrode from the location of the primary electrical contact to the top of a welding arc generated between the leading end of the electrode and a workpiece. There may be at least one point, between the location of primary electrical contact and the outlet end of the bore, at which the electrode makes secondary contact with the body. However, as the body is adapted, along the remainder of the length of the bore, not to substantially short circuit the primary electrical contact. Thus, secondary contact (if any) does not reduce the effective length L over which resistive heating is achieved.

The body may be adapted to enable primary electrical contact with the electrode by being provided with contacting means by which the electrode is held in sliding contact with a surface defining the bore at at least one location within the primary contact region of the length of the bore. The contacting means, at each such location, may comprise a pin, plunger, ball, screw or the like which is mounted in the body of the contact tip so as to project transversely into the bore. The contacting means, where comprising a pin, plunger, ball or the like, may be resiliently biased so as to project into the bore. Where comprising a screw or the like, the contacting means may be in screw-threaded engagement in the body, and able to be rotated so as to move axially and project into the bore. In each case, the contacting means may include a bearing pad, by which the pin, plunger, screw or the like contacts the electrode. The bearing pad may be of a wear resistant material, or a softer, low friction material. The bearing pad may be of an electrically conducting material such as graphite or of an electrically insulating material such as PTFE available under the Trademark TEFLON.

Where primary electrical contact by the electrode is enabled by configuring of the bore to cause the electrode to bed into the surface defining the primary contact region, the bore decreases from a larger cross-section to its cross-section in the primary contact region. In that electrically conducting region the diameter of the bore is smaller but sufficient for smooth passage of the wire through the tip. The arrangement is such that the wire preferentially beds into the bore in a small part of that region. The effective current delivery area is therefore from the region where the wire has bedded in rather than from the entire conducting length of the primary contact region. This is because electrical contact resistance is reduced where the contact area is greatest and the dominant current supply path is the one of least total electrical resistance. The conducting length of the bore may be of a single material such as copper or alloy of copper or a hardenable steel such as silver steel. Alternatively two materials may be used with a preferred order of materials. At the location at which the electrode is to bed into the bore surface, the material defining the bore most preferably changes from one of relatively higher hardness to one of relatively lower hardness. Thus the arrangement most preferably is such that the curvature of coils of the electrode and the stiffness of the electrode brings the electrode into sliding contact with the bore surface at the location to enable bedding preferentially into the material of relatively lower hardness.

Good feedability of the consumable is a necessary condition to enable the preheat length L to be stable. This enables transient electromagnetic fields associated with rapid variations in wire feed speed to be reduced. The variations in wire feed speed referred to here are described in the above-mentioned article by Yamada et al.

In order to facilitate an understanding of the invention, the invention and principles on which it is based now are described with reference to the accompanying drawings in which.

The following discussion is to facilitate an understanding of the present invention. The discussion is based primarily on GMAW but the principles and conclusions apply also to SAW and FCAW.

In its most basic representation, the operation of equipment for GMAW may be interpreted by reference to the operation of an equivalent DC electrical circuit. The welding power supply provides a source of current at a voltage that is essentially constant. The zero reference for this voltage is the potential of the work piece. A consumable, in the form of a wire is fed from a spool, through a liner inside a welding torch and emerges from the contact tip at the end of the torch. In the space between the end of the contact tip and the surface of the work piece, an electric arc heats the end of the wire and melts it. Liquid metal droplets are transferred from the end of the wire to the work piece.

There are two distinct modes of metal transfer. The first is dip transfer, in which the wire consumable momentarily makes contact with the surface of the work piece. In an attempt to maintain constant voltage conditions, the power supply applies a large burst of current for a short time through the wire in the tip and the short circuit contact resistance between the end of the wire and work piece. This burst of current melts the wire back and establishes an electric arc in the space between the end of the wire and the surface of the work piece. The process is repeated at a frequency of the order of 100 times per second. Overall, the current averaged over many cycles is relatively low and, for this reason, dip transfer is often used for the welding of sheet metal. One significant disadvantage of deposition by dip transfer is the occurrence of significant levels of spatter.

At higher current levels, the wire melting rate is sufficiently high to maintain a relatively constant gap between the end of the wire and the surface of the weld pool on the surface of the work piece. Metal transfer is achieved by droplets of metal being detached from the end of the wire, travelling through the arc and arriving at the work piece. This type of transfer may be referred to as spray transfer and is used to achieve high deposition rates.

Figure 1:
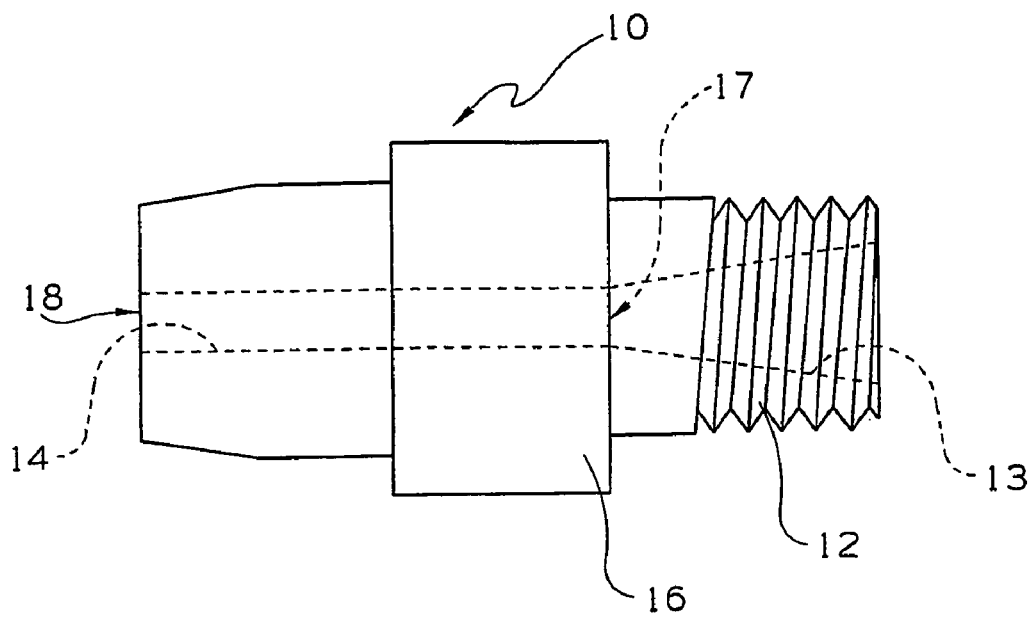
FIG. 1 shows, in side elevation, a schematic representation of a prior art contact tip.

FIG. 1 shows an example of a cylindrical copper alloy tip 10 made, for example, of a copper-beryllium alloy. The tip 10 is suitable, for example, for robotic welding with a consumable solid steel wire of diameter 1.2 mm. The tip 10 is suitable for dip and spray transfer modes. This example is chosen to illustrate the principle of operation of a typical welding tip and to highlight the improvements in performance associated with the present invention.

The tip 10 has a threaded section 12 at its input end, to enable mechanical, electrical and thermal connection with a contact tip holder of a welding torch. The threaded section 12 defines a frusto-conical guide 13 and is able to be screwed into a contact tip holder which provides a source of electric current. The holder also serves as a heat sink for heat generated by current in the tip, heat conducted along a wire consumable in the tip 10 and heat radiated by the arc and subsequently absorbed by the tip 10. Heat arriving at the contact tip holder is removed by flow of water within the torch in a water-cooled torch and by convective flow of air within the torch in an air-cooled torch.

The contact tip 10 also has a longitudinal bore 14, which extends through the tip body 16. The bore 14 usually is of a diameter approximately 0.1 mm to 0.2 mm larger than the diameter of the wire consumable. The latter is guided into bore 14 by guide 13. The clearance of 0.1 to 0.2 mm is typical of tips designed for welding with steel and flux-cored consumables. In general, the lower the clearance, the more reliable is the electrical contact between wire and tip. For other consumable materials, such as alloys of aluminium, the clearance may be larger as these alloys are soft and relatively difficult to feed. Increasing the clearance between wire and tip assists with mechanical feedability of the wire through the tip.

The body 16 of the tip 10 has an average diameter of the order of 8 mm. This is large enough to enable adequate conduction of heat through the tip 10 to the contact tip holder so that the tip can operate at a temperature low enough to inhibit softening of the copper. The overall length of the tip is approximately 35 mm and the length of the bore 14 from the inner end of guide 13 is approximately 25 mm. The length of the bore 14 is such as to ensure that electrical contact of the wire with the body 16, within the bore 14, is continuously achieved. Contact of the wire consumable with the internal surface of the bore 14 may be made at the inlet end 17 of bore 14, in between end 17 and outlet end 18 or at the outlet end 18. Contact may also be made simultaneously at one or more points within the bore 14 of the contact tip 10. The location of these contact points will depend on factors such as clearance between wire and bore 14, the curvature of the wire as it is fed, generally from a circular spool, and any curvature in the neck of the welding torch.

The overall length of 35 mm of the contact tip 10 shown in FIG. 1 is dictated by economy in the use of copper. In GMAW, there is a need to provide a protective gas cover for the wire emerging from end 8 of the tip 10, the welding arc and the weld pool. A cylindri cylindrical welding nozzle surrounds the tip and extends to the end of the tip. Gas flow is in the annular region between the external surface of the tip and the internal surface of the welding nozzle.

Of issues most relevant to performance of contact tips, the most important is wire feedability. It is known from the above-mentioned work of Yamada et al that smooth operation of a GMAW welding process relies on establishing a uniform feed speed for the wire or strip comprising the consumable electrode. This allows a uniform melting rate to be achieved and, at the same time, variations in arc length can be reduced. However, Yamada et al found that, while a feed roller system establishes an expected constant wire feed speed on the feed-roller side of the copper contact tip, this was far from the case for the wire on the torch side and, therefore, for wire emerging from the contact tip. Rather, they found that on the torch side, the wire speed could fluctuate substantially and, over intervals of the order of several milliseconds, the fluctuations could vary from approximately zero to approximately double the average wire feed speed.

Examination of the internal surfaces of the copper contact tips and the surface of the wire emerging from the contact tips used in the work reported by Yamada et al showed that melting, fusion and adhesion occurred between the wire and each contact tip. The stop-start movement of the wire through the contact tip was due primarily to the interaction between the wire and tips.

The fluctuations in wire speed on the torch side inherently influence variations of arc length. However, further adverse effects of this wire speed fluctuation are highlighted by the above-mentioned text by Lancaster. In that work, Lancaster reports that, during an arc welding operation, strong electromagnetic fields are present in the space between a contact tip and a work piece. It is known that electromagnetic fields resist change, while a moving, current-carrying electrical conductor is subject to physical forces and induced currents. Thus, the electromagnetic field associated with the current in a wire consumable and in the arc itself would be expected to respond to fluctuations reported by Yamada et al so as to oppose the changes in wire speed. This type of electromagnetic response would be reflected in variations in induced currents in the wire consumable. Moreover, induced currents and voltages also would disturb the stable operation of the power source supplying current to maintain acceptable welding conditions. Voltage and current transients associated with the erratic wire feeding resulting from the fluctuations in wire speed on the torch side would, in turn, cause the instantaneous melting rate of the consumable wire to vary, further exacerbating arc length control and potentially causing the arc to become unstable.

For the contact tip 10 shown in FIG. 1, it is possible to establish a theoretical upper limit for wire melting rate and a theoretical lower limit for wire melting rate. The principles will now be outlined by reference to an established formula for wire deposition rate in GMAW, based on the algebraic representation:

$$W = aI + bLI^2$$

where "W", "I", "a", "b" and "L" are as detailed earlier herein. Again, for simplicity, but without loss of generality, welding in the down hand position is assumed.

To establish an upper limit for wire feed speed, suppose that, on passing through the contact tip 10, the wire makes contact only at the inlet end 17 of the bore 14 and subsequently proceeds through the tip without touching the tip again. Suppose also that the distance of the end 18 of bore 14 of the contact tip 10 from the work piece (not shown) is 20 mm, typical of normal use of such a welding tip, and that the arc length is 8 mm. To simplify the discussion the arc length will be taken to be constant although in practice it depends on voltage, current and mode of transfer. As the length of bore 14 is 25 mm, the parameter "L" is therefore equivalent to 37 mm (25 mm+20 mm−8 mm) i.e. 37 mm of wire would be preheated by the welding current prior to the wire entering the arc region. This is an upper limit for "L" and hence the corresponding value for W would be an upper limit for wire melting rate and therefore wire feed speed.

A lower theoretical limit for wire feed speed can also be established. Suppose that, on entering the contact tip 10, the wire makes contact only at the outlet end 18 of bore 14 of the tip. Under these conditions, there would be a reduction in preheat length of the wire of approximately 25 mm (the length of the bore) and the effective value of the parameter "L" would be 12 mm (20 mm−8 mm). The corresponding value for W would therefore represent a lower limit for wire melting rate.

Figure 2:
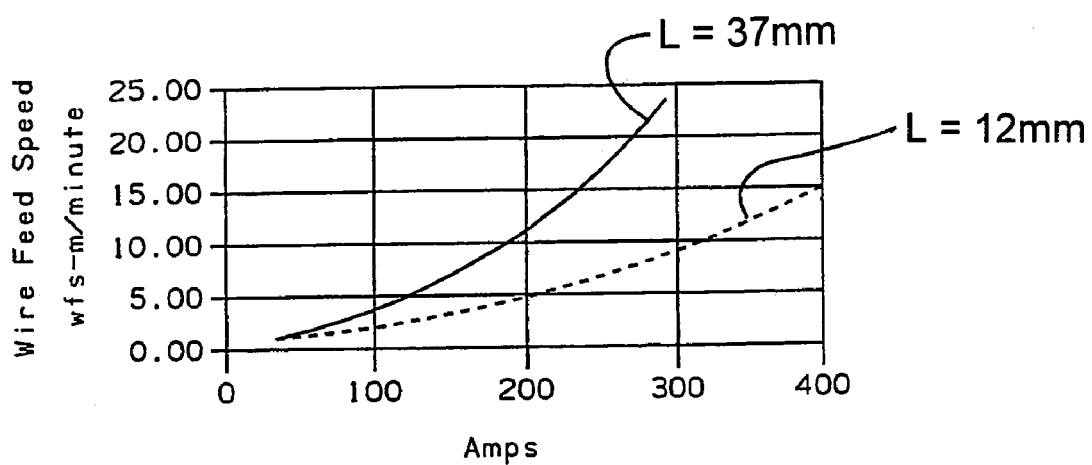
FIG. 2 shows electrode wire feed speed versus current under respective operating conditions for the contact tip of FIG. 1.

Using published data for wire feed speed for 1.2 mm diameter copper-coated solid steel wire, the parameters "a" and "b" were calculated and subsequently the estimates for upper and lower limits for wire melting rate for the copper tip shown in FIG. 1 and a typical distance of 20 mm between the end of the contact tip and work piece. The upper and lower limits for wire melting rates are shown in FIG. 2 for welding currents in the range 100 to 270 amperes. From the data presented in FIG. 2, it is evident that there is a considerable difference between the upper and lower limits. For a wire feed speed of approximately 8 m/minute, the welding current required is 270 A, corresponding to a value for L of 12 mm. If the value for L increases to 37 mm, the required current to maintain a wire feed speed of 8 m/minute is reduced to approximately 180 A. For a wire feed speed of approximately 3 m/minute, the welding current required is 150 A corresponding to a value for L of 12 mm. If the value for L is increased to 37 mm, the welding current is reduced to approximately 100 A.

Of the two wire melting mechanisms i.e. resistive heating and heating by the electric arc, resistive heating is preferable. It is reproducible and especially effective since the electric current that establishes the welding circuit also heats the wire consumable. An electric arc on the other hand is characterised by an ionised gas at temperatures approaching 20000K. Since the melting point of, for example a steel wire consumable is about 1800K, precise control of arc length is required to achieve a uniform melting rate for an arc-dominated process. The benefit of a preheat length of 37 mm compared with 12 mm is not only reduced heat input but a substantially more efficient deposition process. For a wire feed speed of 8 m/minute, for example, resistive heating accounts for approximately 4.5 m/minute i.e. just over 50% of the total wire melting rate if L=12 mm. If L=37 mm, resistive heating accounts for approximately 6 m/minute i.e. 70% of the total wire melting rate. As wire feed speed increases, this proportion increases.

It is evident from the discussion with reference to FIGS. 1 and 2 that the location and number of contact points within the bore of a contact tip can have a profound influence on wire melting rate. Some important features of transfer of electric current from a cylindrical contact tip to a wire within the tip may be identified by an analysis of the electrical resistance of a cylindrical tube. This can be illustrated by reference to a cylindrical tube 25 mm long with an internal bore of diameter 1.2 mm, and an outside diameter of 8 mm. There are two relevant, limiting values for the electrical resistance of such tube.

Electric current may be supplied to a tube in a longitudinal direction by applying a voltage between the ends of the tube. The corresponding resistance $R_{longitudinal}$ may be expressed as:

$$R_{longitudinal} = s \times A^{-1}$$

where s is the resistivity of the material of the tube, x is the length of the tube and A is the area of cross-section. If the current through the tube is I, then the potential difference V driving current between the ends of the tube may be calculated from the product of current and resistance i.e.:

$$V = I\, R_{longitudinal}.$$

Electric current may also be supplied by applying a voltage between the internal surface of the bore and the external surface of the tube. In this configuration, the effective resistance of the tube, denoted $R_{radial}$, may be expressed as:

$$R_{radial} = \ln(r_O/r_I)/(2\pi\sigma x)$$

where σ is the electrical conductivity of the tube and $r_O$ and $r_I$ are the outside and inside radii respectively of the tube. If the current through the wall of the tube is I, then the potential difference may be calculated as before from the product of current and resistance i.e.:

$$V = I\, R_{radial}.$$

Table 1 shows calculated values for $R_{radial}$ and $R_{longitudinal}$ for respective tubes of copper and graphite. The dimensions of the tubular forms in Table 1 are appropriate to a discussion of transfer of current in a welding contact tip. Wire of diameter 1.2 mm is one of the most popular sizes for ease of use and productivity. From Table 1, it is evident that radial resistance is approximately an order of magnitude lower than the corresponding value for longitudinal resistance. Accordingly, the most effective current transfer from tube to a wire in the tube would apparently be achieved by establishing intimate contact between the wire and tube over the full length of the tube. Under these idealised conditions, the radial resistance of even a tube of graphite would be as low as $2.4 \cdot 10^{-4}$ Ohms. For a current of 220 A, the corresponding potential difference between the outer surface of the tube and the internal surface of the bore would be as low as 0.05V.

TABLE 1

Calculated values for radial and longitudinal resistances

| Material | Copper | Graphite |
|---|---|---|
| Internal Diameter - mm | 1.2 | 1.2 |
| External Diameter - mm | 8 | 8 |
| Length - mm | 25 | 25 |
| Resistivity - Ohm · m | $7 \cdot 10^{-8}$ | $2 \cdot 10^{-5}$ |
| Conductivity - (Ohm · m)$^{-1}$ | $1.4 \cdot 10^{7}$ | $5 \cdot 10^{4}$ |
| $R_{radial}$ - Ohm | $8.6 \cdot 10^{-7}$ | $2.4 \cdot 10^{-4}$ |
| $R_{longitudinal}$ - Ohm | $3.5 \cdot 10^{-5}$ | $9.9 \cdot 10^{-3}$ |

The longitudinal resistances are typically at least an order of magnitude higher than the corresponding radial values. For copper, the longitudinal resistance is $3.5 \cdot 10^{-6}$ Ohms and therefore minimal. For graphite the longitudinal resistance is 10 milli-ohms. For a current of 220 A, the potential difference between the ends of the graphite tube would be 2.2V, which, it will be seen, is significant.

Resistive heating of the tip by current carried through the tube wall in the radial direction would be minimal for copper and low even for graphite. From Ohm's Law it can also be shown that the potential of the wire emerging from the tube would be, in effect, the same as that of the tube. Any preheating of the wire within the tube would be therefore be minimal, and the corresponding wire melting rate would be at the lower limit of what is possible. It follows that for this example of what would otherwise be considered an example of perfect current transfer, wire melting rate for a given current would be minimised. In other words, it follows that the minimum wire melting rate will be attained if there is perfect contact between wire and tip over the full length of the bore or, as has been shown earlier, if contact is made only at the outlet end.

In practice, there is some clearance between wire consumable and the bore of the tip. Electrical contact occurs at a number of discrete locations. It is therefore appropriate to consider the consequences of two or more simultaneous contact points of the wire within a contact tip. The simplest example to consider is that of simultaneous contact of the wire with the tip at the inlet end and the outlet end and no intermediate contact. At room temperature, the resistivity of beryllium copper is approximately $7 \cdot 10^{-8}$ ohm·m (see also Table 1). The resistivity of low carbon steel is approximately $1.2 \cdot 10^{-7}$ ohm·m. The ratio of the cross-section of a copper tip to the cross-section of the wire consumable is typically of the order of 50 to 100:1. The combination of low resistivity of the copper tip, coupled with the relatively high cross sectional area of the tip, means that any current in the wire between the inlet and outlet end may be severely reduced by the parallel electrical path in the copper i.e. $R_{longitudinal}$. The effective current supply path would be through the body of the contact tip to the wire at the outlet end of the tip if there is simultaneous contact at the inlet and outlet ends with no intermediate contacts. If initially there were contact at the inlet end only, and subsequent contact at the outlet end, the wire would also cool down as the current in that section of wire was reduced to a minimal value.

Hence, if there is electrical contact at the outlet end of the tip, it is inevitable, within practical limits, that the effective value for L is approximately 12 mm for an arc length of 8 mm. As has been done earlier, the arc length will be taken to be constant. Examination of wear of copper contact tips shows a key-holing effect at the outlet end indicative of essentially continuous contact with the wire consumable. For contact tips of the type described in FIG. 1, the effective value for L is 12 mm. This current transfer at the outlet end represents the least productive use of welding current. Although the electrical circuit is completed at the outlet end of the tip, the welding current is conducted through the tip and any preheat of wire within the tip is minimal.

The electrical stability of the contact point of the wire and tip has further implications. If the wire should momentarily fail to make contact with the outlet end of the tip, the voltage at the end of the wire, as it enters the arc region, will change from what could otherwise be a steady value. Arc length depends on arc voltage. Any variation in voltage at the end of the wire will adversely affect arc length, hence arc stability leading subsequently to weld spatter and possible burn-back of the wire consumable. Burn-back may result in welding of the wire to the tip causing immediate failure of the tip.

For a given current, the fluctuation in voltage of the wire consumable emerging from the tip will depend on the resistivity of the wire. Electrical resistivity is temperature dependent. It is necessary therefore to estimate the average temperature of the wire consumable within the tip. In the above-mentioned text by Radaj it is noted that, for wire electrodes with automatic steady feed, temperature increases nearly linearly from the current input point to the end of the wire. In the immediate vicinity of the arc, the temperature of the wire rises rapidly. The temperature of a droplet of liquid metal attached to the end of the wire is above the melting point of the consumable but would be expected to be below the boiling point of the consumable.

Given the interpretation of the effects of multiple contacts of the wire within a copper tip and welding experience with copper tips, it is estimated that the average temperature of the wire in the tip is of the order of 100° C. for an operating current of 220 A. The corresponding wire feed speed would be of the order of 6 m/minute and the mode of transfer would be spray transfer, hence the choice of 220 A for this particular example. This estimated average temperature rise of 100° C. represents an increase in resistivity of steel of approximately 40%. If the room temperature resistivity is $1.2.10^{-7}$ ohm·m, the wire diameter is 1.2 mm, the length of the bore in the tip is 25 mm and the average welding current 220 A, the potential difference between the ends of a length of wire 25 mm long within the bore of the tip is, from Ohm's Law, approximately 0.8V. Since the voltage drop in the copper tip itself is minimal, the overall fluctuation in voltage associated with resistive heating of the wire emerging from the tip would be approximately 0.8V.

From manufacturers' data, the power supply voltage for spray transfer at 220 A would be of the order of 30V. A fluctuation in voltage of 0.8 V in 30 V could, perhaps, be regarded as insignificant. However, associated with this fluctuation in voltage is the possibility of arcing between the wire emerging from the tip and the exit end of the tip. The arcing arises from switching of current from wire to tip if contact is broken and vice versa when contact is re-established. Arcing may also generate induced voltages at the end of the wire. Furthermore, from the work of Yamada cited earlier, arcing may lead to fusion of the surface of the wire and bore of the tip which, in turn, leads to an adhesive force between wire and tip. Wire feed speed becomes erratic leading to arc instability and spatter.

It will now be shown that it is possible to achieve a wire preheat within a contact tip substantially higher than say 100° C. in the example described above. Suppose that, on entering the tip, the wire makes contact at the inlet end and no further contact with the tip. As explained earlier, the effective value for L is 37 mm of which 25 mm is attained within the bore of the tip. Under these conditions, it is estimated from the above-mentioned work of Radaj that the average temperature of the wire within the tip would be approximately 500° C. From published data for steel, it is estimated that the resistivity of the wire in the tip increases 5 fold to $6.10^{-7}$ ohm·m. From Ohm's Law, the voltage drop in the wire within the bore of the tip would be approximately 2.9V for a current of 220 A. The corresponding value for power generated in the wire in the tip would be approximately 650 W. This represents the most productive mode of current transfer. The electrical circuit is completed at the inlet of the contact tube and the entire welding current is used not only to maintain an electric arc but also to preheat the consumable. If contact at the inlet end could be continuously maintained then fluctuations in voltage and wire feed speed would also be minimised thereby improving the process of droplet formation and transfer.

Suppose also that the tip were made from commercially available graphite with resistivity at the relevant operating temperature of $2.10^{-5}$ ohm·m (see Table 1). From Table 1, the longitudinal resistance of a graphite tip of diameter 8 mm would be of the order of 0.01 Ohms and, it can be shown, comparable with the resistance of the wire in the tip. If there were simultaneous contact at the inlet end and the outlet end, the welding current would be divided approximately equally between wire and tip. Though reduced, wire preheat would still be significant.

If the point of contact were to alternate between inlet end and outlet end, the current distribution would alternate from being carried entirely by the wire consumable to being divided between wire consumable and tip. Arcing between wire and tip would occur as these contacts were made and broken and the extent of local heating in the contact region would depend on the magnitude of the switching current. For metal to metal contact, this type of current switching would be expected to lead to local fusion of the wire and tip and in turn adhesion of the wire to the tip. For a copper tip the problem would be exacerbated since the switching current would be substantially higher than for graphite. For a graphite tip, there is little tendency for the wire to bond to the graphite hence wire feed speed would remain stable. By selecting a graphite material with appropriate resistivity so that the longitudinal resistance of the tip matched the resistance of the wire in the tip, it would also be possible to adequately deliver current to the wire consumable and at the same time to minimise the magnitude of the switching current described above. It is also clear that the resistivity of copper is far too low to allow this type of reduction in switching current.

Two conclusions emerge from this discussion. If a contact tip is to be made from a material with a resistivity as low as that of copper then the region of current transfer should be as compact as possible to minimise the effects of multiple contacts. If a contact tip is to be made from a material of higher resistivity such as that of graphite, this condition may be relaxed provided that longitudinal tip resistance and wire resistance are comparable.

It is proposed that this type of matching tip resistance with wire resistance will produce improved stability of arc length and welding current hence performance for GMAW, FCAW and SAW. At the same time, the benefit of wire preheat will be realised i.e. the effective value for the parameter L will be increased. Since the voltage drops in the wire and tip depend not only on resistivity but also on the dimensions of the wire and tip, a more useful conclusion is to propose that, under operating conditions, the resistance of the tip should match the resistance of the wire within the tip beyond the initial entrance length of the tip. Although such a guideline would reduce undesirable effects on arc voltage of multiple electrical contact of the wire within a tip, the guideline relies implicitly on the assumption that the primary contact of wire and tip remains at the inlet of the tip. If there were prolonged contact at, for example, the outlet end, such prolonged contact could ultimately lead to instability due to a reduction in wire melting rate and resistive heating of the tip. The wire melting rate would be reduced because the equivalent value for preheat length L would be reduced.

Therefore it is preferable that the inlet end of a contact tip be the primary source of current to the wire. One way to achieve this is to minimise the clearance between the wire and the bore of the tip. The combination of low clearance and a slight curvature in the wire, as it is unwound from the spool, enables good electrical contact to be achieved at the inlet end.

The stability of the primary contact point at the inlet end of the tip could be significantly improved by introducing a slight change in direction in the bore at the inlet end of the tip. The combination of a low clearance between wire and bore with a slight change in direction of the bore would ensure that good contact was achieved at all times and the probability of any significant prolonged contact further in the bore reduced. This type of approach would not generally be used for copper tips. It would lead to a substantial increase in cost since intricate machining could be required during manufacture. Nevertheless there are some precedents. Patent GB 2074069 for example, presents an example of a design for a complex copper tip incorporating a slight change in direction at the inlet end. For copper tips the benefits of these types of measures are extremely limited. The undesirable effects of multiple contacts still exist and, in particular, adhesion of the wire to the tip. Burn-back is a further problem.

Five properties associated with the material of a tip are particularly desirable to achieve uniform feeding of wire or strip. The first is a low coefficient of friction between the wire or strip and the material of the contact tip. A low coefficient of friction allows a relatively constant wire feed speed to be established as the wire travels through the tip. Ideally the material of the tip would be self-lubricating.

The second requirement is resistance to elevated temperatures associated with close proximity to the welding arc and heated consumable within the tip. Thus a refractory material is desirable.

The electrical contact between a consumable wire or strip and the internal surface of the contact tip may not be continuous due, for example, to irregularities in dimensions of the wire or strip. An intermittent electric arc may then be produced inside the tip. Such an arc could locally heat the wire or strip to temperatures approaching or even exceeding the melting point of the consumable. In this event, it is desirable that any liquid metal produced at the surface of the consumable does not readily wet and subsequently bond to the internal surface of the contact tip. Contact tips made from suitable refractory, non-metallic material could be expected to meet this requirement.

The fourth requirement follows from the earlier discussion of consequences of multiple electrical contacts. That discussion led to the design guideline for resistivity of the material of the contact tip i.e. the resistance of the wire within the tip should match the longitudinal resistance of the tip. For ferrous consumables in copper tips, the mismatch in resistance is about two orders of magnitude. Matching resistances to within a factor of five would be expected to produce substantial reduction in damage due to arcing.

The fifth requirement is that the material of the tip be a good thermal conductor to enable heat produced in the tip, the wire in the tip or absorbed from the arc to be removed by conduction to the contact tip holder.

Figure 3:
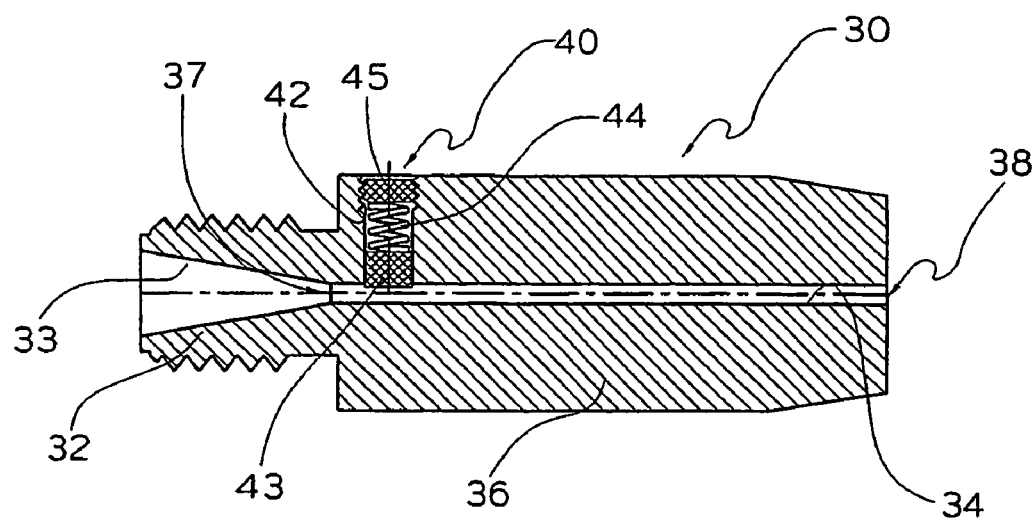
FIG. 3 shows, in a schematic side elevation, a first form of contact Up according to the present invention.

One material that meets these requirements is graphite and it is possible to design a commercially viable tip by machining the entire contact tip from graphite rod. The machined body preferably would then be electroplated with copper, nickel or chromium over the whole external surface for ease of handling, with the possible exception of the working end that is exposed to the welding arc. This working end preferably would subsequently be coated with an electrically insulating refractory lacquer and, after drying of the lacquer, the bore could be drilled out. An example of the finished product is shown in FIG. 3. A tip of this type would have a useful lifetime for low current applications associated with dip transfer and therefore the welding of sheet metal. It would have a reduced lifetime for spray transfer.

With more specific reference to FIG. 3, the overall form of the contact tip is similar to that of tip 10 of FIG. 1. Corresponding parts have the same reference numerals as used in relation to tip 10, plus 20. Thus, tip 30 of FIG. 3 has a threaded section 32 at its input end and a main body 36 which defines a through bore 34 extending from inlet end 37 to outlet end 38. Again, section 32 defines a guide 33 which leads to inlet end 37 of bore 34. Around the working end of body 36, tip 30 is provided with an electrically insulating refractory lacquer coating (not shown).

While, as indicated, it is possible to make tip 30 from graphite, as shown in FIG. 3, it is found that the tip as described to this stage is not satisfactory. This is because the contact area between the electrode and the tip at the inlet end of the tip may be insufficient to transfer the bulk of the current required to achieve the desired wire melting rate. Current flow from the body 36 to the electrode will tend to be from two or more contact points. Although the effects of multiple contacts in graphite may not be as severe as they would be in copper, with a graphite contact tip as in FIG. 3, it is necessary to provide means which ensures a primary contact point within bore 34 which is at or adjacent to end 37, such that this contact point has less contact resistance than any other contact point further along bore 34. In FIG. 3, this is provided by contacting means 40.

Means 40 is provided in a radial passage 42 which communicates with bore at or adjacent to end 37 of bore 34. In passage 42, means 40 includes a plunger member 43 which is lightly biased by a spring 44, such as a coil spring, retained in passage 42 by a cap 45 secured in the outer end of passage 42. Spring 44 biases plunger member 43 towards bore 34, such that a leading end of member protrudes into bore 34. The arrangement is such that, with an electrode passing through bore 34, the protruding end of member 43 is able to bear against the electrode, to bring the electrode into sliding contact with body 36, at the side of bore 34 remote from means 40. Thus, means 40 is able to achieve such contact which minimises contact resistance between the electrode and body 36, and thereby establish a point of primary electrical contact from which resistance heating of the electrode is able to be maintained, while presenting only slight resistance to movement of the electrode through bore 34.

The plunger member 43 of means 40 may be formed of an electrically insulating material, or of an electrically conductive material.

While the description of FIG. 3 is with reference to contact tip 30 being made of graphite, the arrangement shown with provision of means 40 is suitable for use with contact tips of other materials. Thus, instead of graphite per se, contact tip 30 may be made of a graphite composite, such as graphite/silicon carbide composite. Alternatively, tip 30 may be made of copper or a copper alloy. In a further useful alternative, which enables cost savings over the use of copper, tip 30 can be iron or steel. In each case, means 40 provides a practical way of ensuring a required primary contact point. However, even with means 40, it is preferable for tip 30 to be relatively short, such that bore 34 is about 12 mm in length.

A more robust monolithic version, suitable also for spray transfer, could be made from composite materials such as silicon carbide-graphite composite materials. The proportions of silicon carbide and graphite could be chosen to meet the guideline for resistivity. The raw materials for these types of composite materials are generally in powder form. It is possible therefore to mould a bore that has a slight change in direction at the inlet end. In this way a very reliable current delivery point at the entrance of the tip would enhance the performance. In a further enhancement, the composition could be functionally graded to achieve high electrical and thermal conductivity in the threaded end up to the inlet of the bore, then gradually reducing these conductivities to the end of the tip. The combination of silicon carbide and graphite is presented here only by way of example. In particular, graphite-metal and metal-ceramic composites (i.e. cermets) could also be used to manufacture contact tips.

There are two key electrical requirements for optimum performance with a welding power supply. The first is that current be supplied from the power supply to the wire consumable via a continuous, stable path of very low electrical resistance so as to minimise transient current and voltage variations in the welding circuit. The second requirement is to establish a well-defined contact area so that the effective value for the parameter L is stable with time and is reproducible from one welding operation to another. If the main body of the tip is to be made of copper or other material of very low resistivity, then the primary contact area should be as short as possible.

Figure 4:
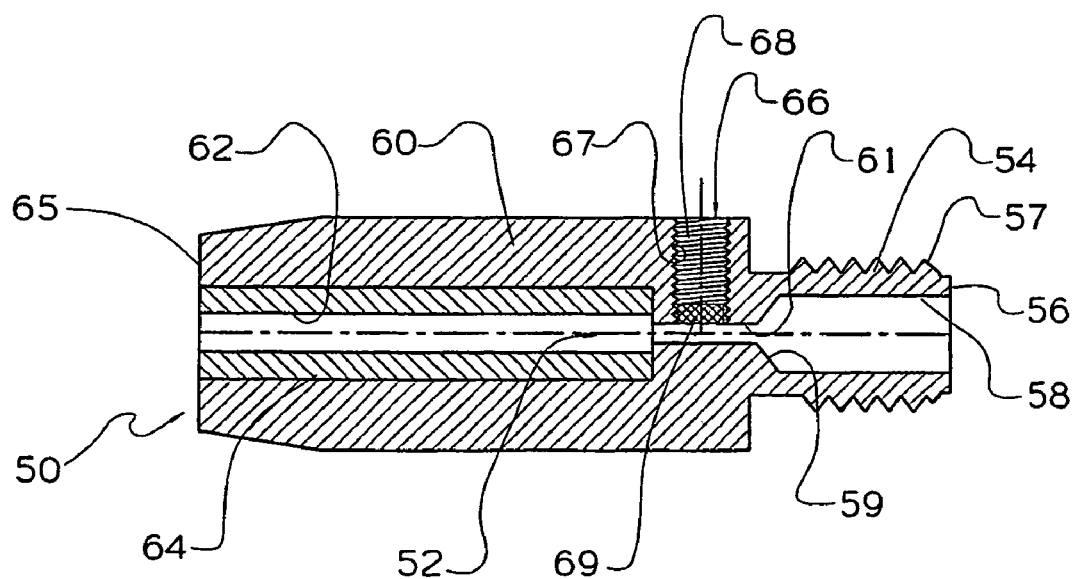
FIGS. 4 to 15 show, in a schematic side elevation, respective further forms of contact tip according to the present invention.

FIG. 4 shows an example of a contact tip 50 that essentially meets these requirements. This particular tip 50 is designed for GMAW. A wire consumable used with tip 50 may be of diameter 0.9 mm. The overall length of the tip 50 may be approximately 38 mm and in the range 35 to 40 mm typical of commercially available contact tips designed for 0.9 mm wire. However the form of tip 50 is suitable for wire diameters other than 0.9 mm. The tip 50 has a design enabling it to be a direct replacement for a conventional tip.

The contact tip 50 is of annular cross-section and defines a bore 52 through which the electrode is able to pass. The tip 50 has three sections each of which defines a respective part of bore 52. The first section 54 extends from the inlet end 56 of tip 50 over a minor part of its overall length. The section 54 is of lesser diameter than the remainder of the length of tip 50 and is externally threaded at 57 to enable tip 50 to be screwed into a contact tip holder (not shown) of a welding torch (also not shown). Within section 54, bore 52 is counter-bored to provide a larger diameter inlet end 58 from which bore 52 has a frusto-conical taper 59 to in small diameter form beyond section 54.

The second section 60 of tip 50 is formed integrally with section 54. Over a short distance from taper 59 of, for example, about 5 mm, bore 52 has a length 61 which is defined by section 60 and is of a minimum diameter. From length 61, bore 52 has a remaining length 62 defined by a third section 64 of tip 50. Section 64 is an annular insert within section 60. The section 60 is counter-bored from end 65 of tip 50 to receive section 64. In section 60, section 64 may be a firm fit therein, or section 64 may be retained by a ceramic paste.

As indicated, tip 50 may have an overall length of about 38 mm and be designed for use with 0.9 mm diameter wire consumable electrode. In that context, sections 54 and 60 may have lengths of approximately 10 and 28 mm respectively. Along inlet end 58, bore 52 may have a diameter of about 4 mm, reducing to 1.0 mm over its length 61 to provide a 0.1 mm clearance for 0.9 mm consumable. Over its length 62, bore 52 may have a diameter providing a clearance of from 0.5 to 1.0 mm for the consumable.

The first and second sections 54,60 of the contact tip 50 is of a metal having a relatively high level of electrical conductivity. The third section 64 is made of non-metallic, electrically insulating material. The first and second sections 54,60 preferably are made of copper, such as hard drawn copper or a copper alloy. The third section 64 preferably is of a refractory, electrically insulating material such as alumina or a machinable, ceramic material. However, other electrically conductive and insulating materials can be used.

The diameter of length 62 of the bore 52 is indicated as approximately 0.5 to 1.0 mm greater than the diameter of the wire consumable. The clearance is not critical but an excessive clearance in section 64 is not recommended in order to avoid wire wander during welding. Too tight a fit introduces friction between the wire consumable and ceramic and can adversely affect feedability of the wire consumable. Also, section 64 most preferably is a non-porous ceramic. It is found that porous ceramic can contain chemically-bound water and/or transmit water from ceramic paste by which section 64 may be retained. Alternatively, the end of the copper tube may be peened to retain the ceramic insert.

The inlet end 58 and taper 59 of bore 52 serve to guide a wire consumable through lengths 61 and 62 of bore 52. The section 54 of tip 50 is to provide that guidance and to enable the tip 50 to be mounted in the holder of a torch, rather than to provide electrical contact with the consumable. Such contact is made in bore 52, beyond section 54 and, for the purpose of making electrical contact, the effective inlet end of bore 52 is at the junction between taper 59 and length 61.

A key feature of the contact tip 50 is a pressure point 66 whereby wire entering the tip is pressed against a surface defining the bore 52. The pressure point 66 enables current to be transferred from the bore of the tip to the wire in a well defined area of the tip. Accordingly the value of the parameter L referred to earlier is also well defined. In this case the value for the parameter L is the distance from the pressure point to the welding arc at the end of the wire.

All contact tips are designed to be used in conjunction with a contact tip holder in a welding torch. In use, the tip is screwed into the contact tip holder such that the rear surface of the body of the tip is in firm contact with the mating surface of the contact tip holder. This provides mechanical stability as well as a path for heat generated in the contact tip to be conducted to the contact tip holder and subsequently removed from the body of the torch by air or water cooling. One key feature that is common to the design of a majority of the tips shown herein is the location of the current delivery area within the tip. To maximise preheat length, the current delivery area should be located in the vicinity of the effective inlet end of the bore. To assist with removal of heat generated within the contact area as well as heat conducted along the wire within the tip, the current delivery area in tips shown herein is preferably located within the main body of the tip rather than in the threaded inlet end. Although preheat length is thereby reduced, this disadvantage is offset by lower operating temperatures and therefore more reliable overall performance.

A pressure point within a tip may be made in a number of ways. The pressure point 66 shown in FIG. 4 is made by drilling a radial hole 67 in the section 64 of the tip 50 up to the length 61 of the bore 52. For the dimensions of the tip 50 detailed above, a suitable diameter of the radial hole 67 is about 3 mm. This hole 67 then is tapped so that a set screw 68 may be inserted therein. The purpose of the set screw 68 is to a compress plug 69 of a small amount of a soft, refractory material at the leading end of screw 68 against the wire entering the tip thereby pressing the wire to one side of bore length 61. Examples of suitable materials for plug 69 are PTFE, graphite-loaded PTFE and graphite tape. These materials are stable at elevated temperatures and sufficiently soft to conform to the shape of the wire in the bore and thereby achieve a soft, low friction, generally continuous, mechanical, sliding contact with the wire. Consequently, in spite of introducing frictional force at the pressure point, the feed force required to push the wire through the tip is not excessive or detrimental to feedability of the wire.

A tip of the form described in FIG. 4 has been constructed and its performance evaluated in laboratory tests. Compared with conventional copper tips of similar overall dimensions operating under essentially the same welding conditions (i.e. voltage and wire feed speed) it was found that, for any given wire melting rate, current and therefore heat input were reduced. The value for L for the tip 50 shown in FIG. 4 is substantially higher than the corresponding value for L for a conventional copper tip. The electric current in the wire preheats a greater length of wire than that in a conventional copper tip. Referring to the formula for wire melting rate it is evident that, for a given value for W, the current required to maintain that value of W is reduced if the effective value for L can be increased. Furthermore welding fume was also reduced substantially. The reduction in fume is believed to arise from improved feedability and also the reduced influence of the electric arc. The greater the value for L, the greater the contribution of the resistive heating by current in the wire to the melting rate W. The role of the electric arc, which is characterised by extremely high temperatures, is reduced. Accordingly it is expected that the temperature of droplets of metal transferred from the end of the wire to the workpiece will be lower than the corresponding temperatures for conventional copper tips operating at the same wire melting rate. Consequently evaporation of metal from the end of the wire exposed to the arc is reduced. Since evaporation of metal from the end of the wire is a significant source of fume, the total amount of fume generated for a given wire melting rate W is therefore reduced. There is a further and major reduction in fume generated due to improved wire feedability. Weld spatter was also substantially reduced. It is believed that this reduction in spatter is due in part to the reduced droplet temperature, and therefore the fluidity, of molten metal at the end of the wire consumable. Furthermore any spatter produced is less likely to adhere to the workpiece because the probability of bonding between liquid metal droplets and a relatively cold workpiece decreases as the temperature of the droplets of spatter decrease.

There was a peculiarity noted in relation to the operation of the tip described in FIG. 4. This was identified following examination of the wire in the torch. At the conclusion of a welding pass, a length of wire (typically one metre) would be fed through the tip at the end of the torch with the welding current switched off. At random locations along the length of wire fed out, it was observed that the surface of the wire had been discoloured by arcing that had occurred in the region of the torch between the feed rolls and the contact tip i.e. prior to the wire entering the tip. This arcing had occurred during the welding operation immediately preceding the inspection. Now the wire within the torch is guided by a liner, usually of steel wound in the form of a spiral with closely spaced turns. The liner extends from the feed rolls in the welding machine to the contact tip and is generally in contact with the tip.

It was concluded that arcing had occurred in the preceding welding operation during short moments in time (perhaps microseconds or less) when the wire in the contact tip did not contact the bore of the tip. Such contact failure could be due to local irregularity in wire diameter, oxide deposits on the surface of the wire and lateral movement of the wire in the tip. During these short moments, when there was an open electrical circuit within the tip, other higher resistance circuits external to the tip could and would be formed with temporary electric arcs completing those circuits. An example of one of these undesirable current paths would be from the output of the power supply to contact tip to the wire liner ahead of the contact tip to a section of wire preceding the tip then through the wire in the tip and emerging beyond the tip to the welding arc and ending at the workpiece. Ultimately such intermittent arcing may destroy the liner. It may also lead to welding failure if the wire within the torch welds itself to the liner. A benefit would result if the steel liner were to be replaced with an insulating one, such as one of TEFLON. Arcing would still be likely to occur somewhere in the welding circuit but with unpredictable and undesirable consequences. A better approach for improving on tip 50 of FIG. 4 would be to eliminate the open circuit condition.

Since metal transfer was occurring apparently satisfactorily while welding with tips of the form described in FIG. 4, it was also concluded that, for most of the welding time, current transfer had occurred within the respective tip at the pressure point. One way to avoid an open circuit condition would be to install a second pressure point immediately adjacent to the first pressure point. In effect both contacts would be closed most of the time. Should one of the contact points be open, current transfer would be made through the other. Since the pressure points are adjacent, they would operate at essentially the same electrical potential, so that the welding arc would be stable. Current transfer would therefore be continuous and, in the absence of voltage and current transients associated with supply of current to the wire, there would be a substantial reduction in spattering. Fume generation would be reduced for reasons already described. In summary, the probability that both contact points could be simultaneously open is negligible.

Figure 5:
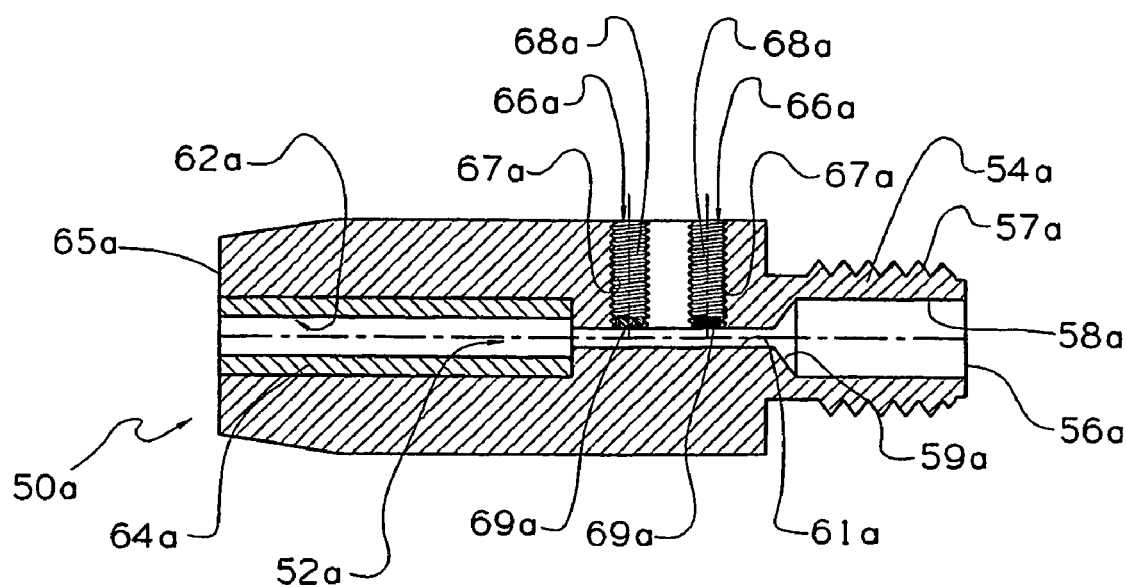

A tip 50a with two pressure points was therefore constructed and is shown in FIG. 5. This is substantially the same as tip 50 of FIG. 4, except for there being two pressure points and corresponding components having the same reference plus "a". There are two threaded holes 67a, each with a screw 68a having a plug 69a. It was found that the operation of the tip 50a as shown in FIG. 5 is superior to conventional copper tips. There was no evidence of arcing in the wire in the torch prior to entering the tip. During welding, the arc length was stable. In developing the invention described in FIG. 5, a new principle had been established for GMAW. With respect to a sliding electrical contact, optimum current transfer may be achieved by supplying current at two (or more) current delivery points operating at essentially the same potential. If these current delivery points are thought of as equivalent to electrical switches, then optimum performance will be attained if the switches are designed to function in a normally closed condition such that the probability of both being open simultaneously is negligible. If the switches are designed to operate at the same potential, then the performance of an external circuit relying on these switches with both switches closed cannot be distinguished from the performance with only one of the pair closed. The external circuit will therefore not be subject to transient variations associated with short-term variations in current transfer in one of the contacts. Any other transients observed will be intrinsic to the process. In the case of GMAW, droplet transfer will lead to inescapable transients but the droplet transfer will occur under essentially ideal conditions and the true capability of GMAW can and will be realised.

There is an additional significant benefit associated with using two current delivery points operating at effectively the same electrical potential. This benefit is related to the phenomenon of burn-back of the electrode. Under stable operating conditions arc length is typically less than half of the distance between the end of the contact tip and the workpiece. If the electrical contact resistance between the wire and the tip were to increase due, for example, to a local variation in wire diameter then, under conditions of constant voltage, the current in the wire will decrease. In turn this will lead to a sudden decrease in wire melting rate and a corresponding increase in arc length. Under certain conditions the arc length can exceed the stand off distance between the end of contact tip and the workpiece. The electrode is said to burn back inside the tip and may either be welded to the tip or become wedged in the bore of the tip. Usually the damage to the tip is irreparable. The use of two or more pressure points reduces the possibility of burn back arising from intermittent high electrical contact resistance between wire and tip since it is unlikely for both contacts to simultaneously have a high resistance.

There is another important difference between the tips shown in FIGS. 4 and 5. In FIG. 4, current is transferred to the wire consumable over a length of copper bore of about 5 mm i.e. in length 61 of bore 52 of tip 50. The length of the ceramic insert is about 23 mm and a lower limit for the length of wire preheated inside the tip is therefore 23 mm. In FIG. 5, insert section 64a is shorter than section 64 of FIG. 4 by about 5 mm. Thus, current is transferred to the wire consumable over a large proportion of length 61a of copper bore of 10 mm. A lower limit for the length of wire preheated inside the tip is therefore 18 mm. It is evident that the larger the length of bore over which current is delivered, the lower will be the wire preheat length within the tip if the total tip length is held constant. The current delivery area is subject to wear and it is reasonable to assume that a small current contact area will wear a faster rate than a large contact area. There will therefore be a balance between performance as measured by current reduction for a given wire melting rate and tip lifetime. As a general guideline, it would be undesirable to make the current contact length a substantial proportion of the total length of a tip. In this respect there is a further important consideration. One of the most important measures of productivity is wire feed speed. The contact area represents an obstruction to the smooth passage of wire through the tip. It is expected that the smaller the contact area, the smaller the obstruction and therefore the higher is the maximum operating wire feed speed. The tip shown in FIG. 5 has a relatively small contact area in comparison with the tip shown in FIG. 1. The tip shown in FIG. 5 can be reliably operated at a wire feed speed of 20 m/minute. This is well in excess of the manufacturer's recommendation for wire consumable of diameter 0.9 mm.

The means of constructing a pressure point in which the electrode is forced into light sliding contact in the first part of the metal bore, with the material defining the bore, may take a variety of forms. In the specific example of FIG. 3, the electrode is resiliently biased into light sliding contact. In that arrangement, the body of the contact tip defines a passage which extends laterally with respect to, and communicates with the first part of, the bore. The passage houses a contact member and a spring acting to force the contact member into the bore for engaging the electrode. The spring acts through the contact member to urge the electrode into light sliding contact with a side of the bore remote from the passage. The advantage of a spring-loaded contact is that one tip could be designed to accommodate a range of wire sizes. It would for example be possible to design one tip to function with wires of diameter in the range 0.9 mm to 1.2 mm.

Wire consumable for GMAW is supplied in two types of packages. The most common package is a compact spool of capacity typically about 15 kg. The wire has an intrinsic curvature associated with deformation induced in winding the wire onto the spool. This curvature is characterised by two parameters. One is referred to as the cast of the electrode and is the diameter of one loop of unrestrained wire unwound from the spool. The other parameter is referred to as the helix and is the vertical distance that the end of a single loop of wire is above the beginning of the loop. The second type of package may be referred to as an "autopak" with a capacity to hold at least 300 kg of wire, compactly wound and housed in a portable cardboard drum.

The curvature of the wire supplied from either type of package allows the wire to bed into the material of the contact tip. This can assist in providing a reliable electrical contact within the tip. It does also lead to wear of the contact tip and ultimately to poor performance. With respect to tips of the form described in FIGS. 4 and 5, the optimum angular location of the pressure point or points is to coincide with the convex curvature of the wire as it passes through the tip.

The use of pressure points as described in FIGS. 4 and 5 represents the introduction of mechanical constraints to the movement of wire through the tip. However, we have found that it is possible to reproduce the same type of performance as obtained from tips of the form shown in FIG. 5 by a different application of the principle of supplying two, normally closed, current contact points, but without directly constraining the movement of the wire through the tip.

Figure 6:
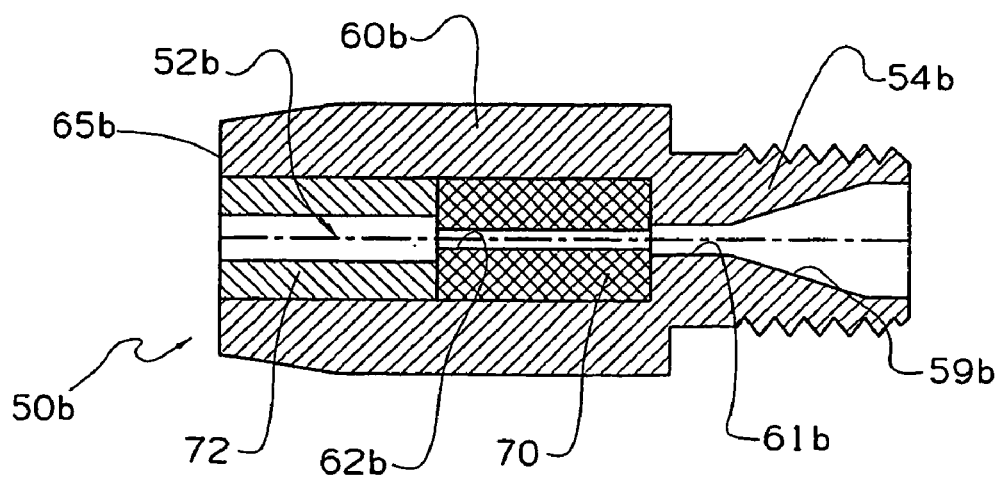

FIG. 6 shows an example of such a contact tip which provides an example of this. Components corresponding to those of contact tip 50 of FIG. 4 have the same reference numeral plus "b". The tip 50b is designed for wire of diameter 0.9 mm but, again, the design principles presented here are not restricted to wire of diameter 0.9 mm. The tip 50b has a body which defines sections 54b and 60b and which, in this particular instance, is made of a copper alloy containing chromium and zirconium. The section 54b defines a tapered conical guide 59b to facilitate smooth entry of the wire into the bore 52b. The body also defines a short inlet length 61b of bore 52b. The section 564b comprises two inserts which together define length 62b of bore 52b. The first insert 70 is of graphite, preferably a fine-grained, extruded graphite, which defines a first part length 62b of bore 52b. The second insert is a length of ceramic tube 72, such as alumina, glued inside the copper alloy body with refractory cement. The ceramic tube 72 acts as a guide for the wire emerging from the tip and defines an outlet end 65b of contact tip 50b.

The coefficient of expansion of metals such as copper is generally higher than the coefficient of expansion of ceramic materials. For applications involving high operating tip temperatures the insert comprising ceramic tube 72 may become loose in the copper body. To prevent tube 72 moving it may be necessary to peen the copper body at end 65b to prevent the insert from becoming dislodged. Alternatively the insert could have an external thread and be screwed into the copper body which would therefore be modified to accept such an insert.

During welding, the wire enters the tip 50b through the conical inlet section 54b and makes its first low resistance contact with the tip 50b at the inlet end part 61b of the bore 52b in the copper alloy body. The diameter of the bore part 61b is approximately 1.05 mm, hence the clearance between the wire and bore part 61b is approximately 0.15 mm. This is sufficient to allow smooth entry of the wire into and through the bore 52b of the tip 50b. A second low resistance contact area is at the beginning of the bore part 62b in the graphite insert 70. The graphite is softer than copper and the wire beds itself into the bore part 62b of the graphite insert 70, providing a second current contact which may be thought of as equivalent to a normally closed contact. The bore part 62b in the graphite insert 70 is of approximately 0.95 mm diameter i.e. approximately 0.1 mm less than that of the bore part 61b in the copper body, to accommodate this bedding in process. For a new tip 50b, the bedding in occurs almost immediately after welding is commenced for the first time and does not significantly detract from overall performance either initially or in subsequent use. The diameter of the bore part 62b in the graphite insert 70 is not made significantly less than 0.95 mm so as to avoid a tight fit in the graphite. As detailed above, the radial electrical resistance of even a relatively poor conductor such as graphite of the type used in the construction of the tip of FIG. 6 is extremely low. A tight fit between the wire and the bore 52b in the graphite insert 70 could enable the graphite insert 70 to electrically short circuit the current in the wire with the graphite insert leading to reduction in preheat length L and also to variation in voltage of the wire emerging from the graphite insert. In turn this would lead to instability in arc voltage and arc length and ultimately to welding defects.

The external diameter of the graphite insert 70 is such that there is an interference fit between the insert 70 and the section 60b of the copper alloy body. Electrical contact between the graphite insert 70 and copper alloy body section 60b is further improved by the use of a thin film of copper loaded, electrically conducting grease applied to the external surface of the insert 70 during assembly. This grease also facilitates assembly of the composite tip 50b. Since there is good electrical contact between the graphite insert 70 and the copper alloy body section 60b, the electrical potentials of the two current delivery points i.e. the first one at the beginning of the bore part 61b and the second one of the beginning of the bore part 62b, are essentially the same. The length of the graphite insert 70 in FIG. 6 is usually in the range of 11 mm to 13 mm to reduce the possibility of the wire bedding in at other locations substantially distant from the entry point in the graphite. This length has been determined by experiment and is long enough to allow good electrical contact as well as ease of handling during assembly of the tip. A practical lower limit for the length of the insert would be approximately 5 mm. With this combination of measures it has been possible to establish the equivalent of two normally closed current contact points operating at essentially the same potential. Accordingly the performance of the tip 50b during welding is comparable to that of the tip 50a shown in FIG. 5 and is superior to conventional copper tips with respect to current for a given wire melting rate. Spatter is minimised and fume generation reduced substantially.

As indicated, tip 50b has a restriction of the length of the graphite insert 70 to prevent the wire in the graphite insert bedding in at more than one location. This bedding in process depends on the stiffness of the wire. One of the most important variables determining stiffness is wire diameter, the greater the diameter the greater the stiffness. For wires of diameter less than 1.6 mm there is a tendency for the wire to weakly bed into the graphite at more than one location. As the current delivery point within the graphite insert changes from one location to another, current and potential in the wire emerging from the tip both change. Arc length is therefore unstable and the wire melting rate is variable. This leads to defects in the weld. It is therefore highly desirable to restrict the length of the graphite insert for such wires to eliminate the possibility of multiple current contact points in the graphite insert.

One of the key performance indicators of a welding tip is the lifetime of the tip. While the tip 50b of FIG. 6 is functioning correctly, the wire consumable slides over the short length of copper (in this case approximately 4 mm) in the bore part 61b of the tip 50b and then over a region of graphite adjacent to the junction between the graphite insert 70 and the end of the bore part 61b in section 54b of the body of copper. There is sliding friction between the wire consumable and each of the copper bore part 61b and the graphite insert 70. Graphite can wear away faster than copper, but the overall wear rate of the copper-graphite combination is controlled by the wear rate of the copper. Ultimately the entrance to bore 52b of the tip 50b becomes elliptical and the electrical contact between the wire and the copper body at section 54b of the tip becomes mechanically and electrically unstable. The effective current delivery area can move from the junction between the graphite and copper to a region within the graphite insert 70. In effect the wire preheat length is reduced and therefore the current required to maintain a particular wire melting rate is increased. This is therefore a sign of deterioration in performance of the tip. There is also an increase in the level of spatter since the probability of an open circuit condition, albeit momentary, is increased.

For a tip of the type shown in FIG. 6, a lifetime of approximately 3 hours is possible. Here the term lifetime is used to represent "arc-on" time, that is, the time that arc welding is in progress. The welding conditions that applied in a lifetime test were for a copper coated steel wire of diameter 0.9 mm, a wire melting rate of approximately 14 m/minute, a current of 165 A and a voltage of approximately 30V. A pulsed power supply was used in conjunction with a robotic torch. This was to simulate conditions that are relevant to robotic welding in automotive applications.

Although the lifetime test has been carried out at the upper end of the wire feed speed range for 0.9 mm wire consumable, it is important to appreciate that this composite tip shows exceptional stability at low wire feed speeds of the order of 2 meters per minute. These wire feed speeds coincide with dip transfer and are particularly important in the welding of thin metal sheet. The combination of improved feedability, reduced operating current relative to conventional technology, reduced risk of burn-through and reduction of spatter are key features of the operation of this tip.

The graphite insert in the tip of FIG. 6 serves an additional purpose. In the event that the electrode burns back inside the tip, liquid metal at the end of the wire may solidify within the ceramic insert or, failing that, within the graphite insert. The solidified metal is unlikely to bond to the graphite insert and the function of the tip may be restored pushing the electrode out of the tip. In a conventional copper tip, burn-back usually causes irreparable damage to the bore of the tip with the end of the electrode permanently welded to the bore of the tip.

Having verified these design principles for contact tips it is now possible to design tips specifically for high deposition rates in spray transfer. For simplicity but without loss of generality, non-pulsed GMAW will be considered. The mechanisms for dip and spray transfer are explained more fully above. However, in brief, spray transfer is characterised by detachment of liquid metal droplets from the end of the wire through the arc to the work piece. The end of the wire does not contact the weld bead. High deposition rates at lower currents may be attained by increasing the length of the ceramic guide tube in the copper alloy body of the tip.

Figure 7:
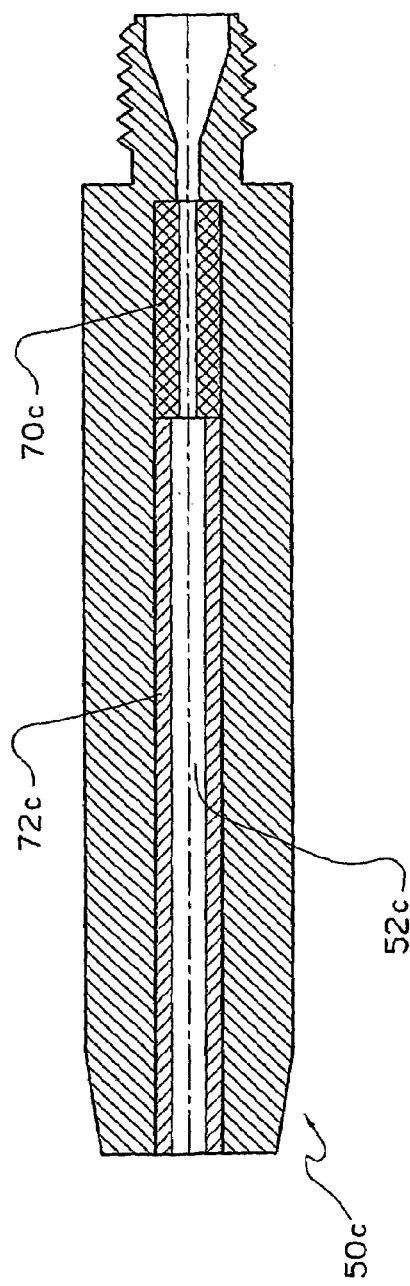
Figure 8:
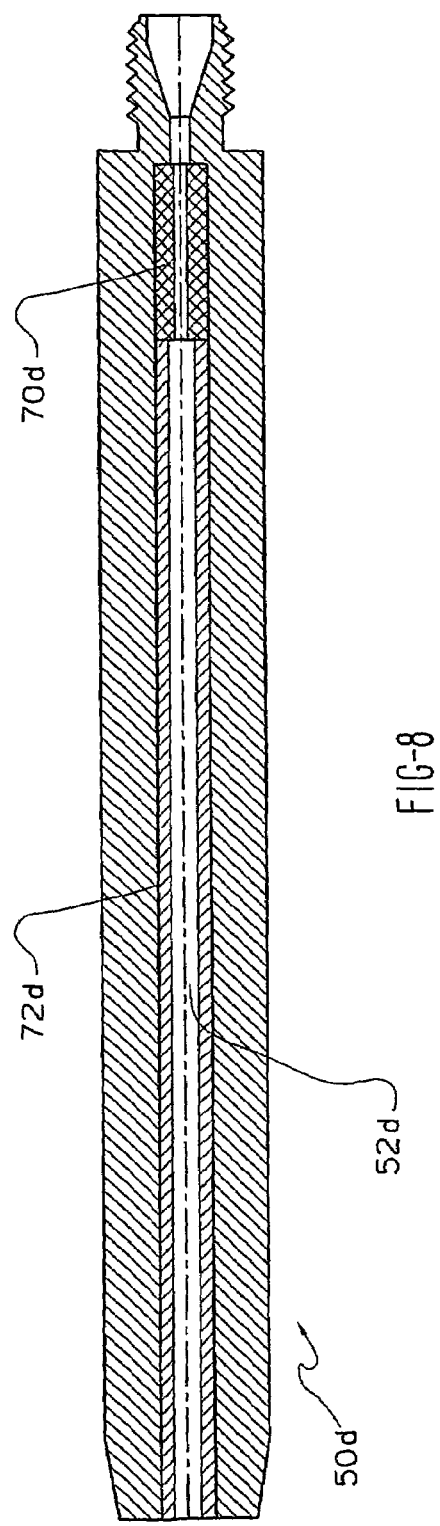

FIGS. 7 and 8 illustrate examples of respective tips 50c and 50d made in such as way as to increase the preheat length L. In tips 50c and 50d, components corresponding to those of tip 50 of FIG. 4 have the same reference numeral plus "c" and "d", respectively. For these tips, the restriction of total tip length of 35 to 40 mm has been removed. The performance of a tip 50c as shown in FIG. 7 has been verified by experiment. The construction of this will be apparent from the description of FIG. 6 since the materials are the same and the principal differences are solely in relation to longitudinal dimensions. Thus, the tip 50c has an overall length of 68 mm, graphite insert 70c is approximately 13 mm long, while ceramic insert 72c is 44 mm long. The diameter of bore 52c over its successive sections defined by copper alloy, graphite and ceramic are as detailed for tip 50b of FIG. 6, as tip 50c also was made for use with 0.9 mm diameter wire.

With tip 50c, using copper coated wire 0.9 mm diameter, a wire melting rate of approximately 16.5 m/minute has been attained with a current as low as 120 A. The wire feed speed of 16.5 m/minute is already the maximum wire feed speed of most commercially available conventional machines. With a conventional copper tip the wire melting rate of 16.5 m/minute is impractical since the current required to achieve that wire melting rate would be above the recommended maximum current for that consumable.

At this stage it is not known what is the practical upper limit for increasing electrode extension. The issue is complicated by limitations inherent in current power sources. Extended wire preheat lengths, particularly of the order of 100 mm, may require higher operating voltages than are generally available and therefore in order to achieve the projected very high wire melting rates it is anticipated that a new high-speed wire feed unit with corresponding power source will have to be acquired Nevertheless the tip 50d shown in FIG. 8 was constructed. The construction of tip 50d also will be apparent from FIG. 6. In this case, the tip 50d has an overall length of 112 mm, graphite insert 70d is 13 cm long, while ceramic insert 72d is 88 mm long. Again, the diameters of successive sections of bore 52d are as detailed for tip 50b of FIG. 6. The effective preheat length is approximately 100 mm and the end of the wire becomes very soft and difficult to feed uniformly during welding. The quality of the welds has been inconsistent and it is considered that, taking into account limitations in existing power source technology, the preheat length of 100 mm is a practical upper limit for wire of diameter 0.9 mm. Nevertheless experience with the tips shown in FIGS. 7 and 8 indicate that a preheat length of the order of 100 mm would be practicable for wires of diameter greater than 1.2 mm.

It is appreciated that ceramic extension pieces have been made to increase the electrode extension for conventional copper tips. However, the relatively poor feedability associated with conventional copper tips and the softness of the preheated length of welding wire has prevented the type of benefits now available from having been realised.

Although the tips 50c and 50d shown in FIGS. 7 and 8 are composite tips comprising a copper alloy body, graphite insert and ceramic guide tube, the same design principle can be applied to manufacture long tips based on two pressure points as described in relation to tip 50a of FIG. 5. It is also important to appreciate that the metal body need not be of copper alloy. Steel is acceptable. The main proviso with the use of steel is that a refractory enamel coating would be applied to the external surface of the tip to minimise adhesion of any spatter.

It is also important to appreciate that more than two pressure point may be used. For very stiff wires of diameter 3 mm or more it may be advantageous to have three pressure points closely spaced along the axis of the bore but displaced radially at intervals of 120 degrees. In this way it would be expected that two of the three would always be in contact with the wire consumable.

Given the limitations on wire feed speed in currently available machines, to achieve higher deposition rates it is necessary to use wire consumables of diameter greater than 0.9 mm. The same design principles apply, and the key design guideline is to limit the length of the graphite insert so as to prevent the wire from bedding in at two distinct areas within the graphite. The stiffness of a wire depends on its diameter. As the diameter increases, so does the stiffness. With the increase in stiffness there is an increase in the wear rate of the contact tip. For a contact tip of the type shown in FIG. 6, the controlling wear mechanism is the wear rate of the copper at the entrance of the tip. The tip lifetime may be increased by increasing the length of the copper entry length from for example 4 mm as shown in FIG. 6 to approximately 10 mm. The longer length of copper will spread the load imposed by the curvature in the wire consumable and therefore the wear rate of the copper contact area will be reduced. The disadvantage of increasing the copper contact length is the introduction of short circuits in the wire sliding over that copper entry length whenever the wire makes good contact at more than one point. This leads to erosion of copper and reduction of feedability due to adhesion of the wire and the copper part of the bore. Another disadvantage is the reduction of length of wire preheated within the tip.

Figure 9:
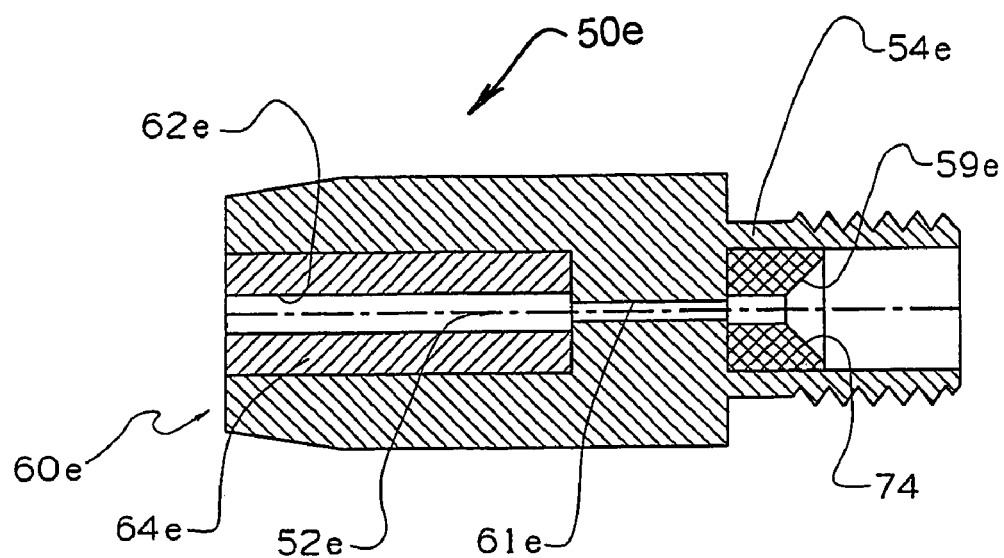

A practical alternative to increasing excessively the contact entry length is to use a different combination of materials at the entrance of the tip. FIG. 9 shows one example successfully trialled for use at high wire feed speeds and a wire consumable of diameter 1.2 mm. In FIG. 9 there is shown a contact tip 50e in which components corresponding to those of tip 50 of FIG. 4 have the same reference numeral plus "e". The tip 50e has a body which defines sections 54e and 60e and which is mostly of copper. However, section 54e includes an insert 74 within the copper body. The insert 74 is of annular form and of sintered tungsten. The insert 74 defines the taper 59e and defines a 3 mm long inlet part of bore length 61e of bore 52e. The outside diameter of the tungsten insert 74 is approximately 0.05 mm larger than the recess in the copper part of section 54e and the insert 74 is pressed into the copper body during assembly of the tip. The tungsten insert provides the first of two current delivery components with tungsten being chosen for its resistance to sliding wear by the wire consumable. Immediately following the tungsten insert 74, there is an 8 mm part bore length 61e defined by copper. Relative to tungsten, the copper has low resistance to sliding wear and, in this arrangement, the copper has in effect replaced the graphite insert shown in tips of the type shown in FIG. 6. The section 64e of the tip is an 18 mm long insert of machineable ceramic. For wire of diameter 1.2 mm the diameter of the part of bore length 61e in the tungsten insert 74 is approximately 1.3 mm, the diameter of the part of the bore length 61e of copper is approximately 1.25 mm and the diameter of the bore length 62e in the ceramic insert is of section 64e approximately 2.0 mm. As wire enters the tip it slides over the tungsten insert 74 and beds itself into the copper and is subsequently guided out of the tip through the ceramic section 64e. The step change in diameter of the conducting part of the bore is small but significant. The step is large enough to establish a well defined contact area in the copper at or beyond the step. The precise location depends on the clearance between wire and bore, the wire stiffness and curvature. The back-up current delivery area is the tungsten insert in the region adjacent to the step. Both current delivery areas operate at essentially the same potential and an open circuit condition is unlikely. The preheat length is well defined and the wire melting rate uniform. Any obstruction to the smooth passage of wire is small and high wire feed speeds are therefore attainable. The lifetime of this type of tip is controlled by the wear rate of the tungsten. For non-pulsed GMAW and a wire feed speed of approximately 15 m/minute, the current required to maintain that melting rate is approximately 290 A for an applied voltage of 34V. For a conventional copper tip at the same wire feed speed the current required is approximately 400 A. The lifetime of the tip even at this high wire feed speed is approximately 2 hours. Tungsten is difficult to machine and is relatively expensive, and insert 74 therefore would preferably be sintered to as close to its final dimensions as possible. Other viable alternatives are hardenable carbon steels, silver steel, white irons and nickel and cobalt based hardfacing alloys. One tool steel, namely silver steel, has been found to be both effective and convenient to use. This is silver steel which is a 1% carbon tool steel supplied centreless ground to close tolerances. It is machineable and may be substantially hardened by heat treatment after machining. It has been successfully used as an alternative to tungsten both in its original as supplied condition and in its heat treated condition.

One other option to a tungsten copper combination as described in FIG. 9 is to have an insert of silver steel in a body of mild steel. This would provide a good match between the coefficients of thermal expansion between the body and the insert.

At high wire feed speeds there is evidence of accelerated adhesive wear between copper coated steel consumables and copper tips. Since the environment within a tip is essentially chemically inert, it is difficult for an oxide film to form on the exposed part of the copper bore and the wire itself. In the absence of surface oxide films, copper bonds to copper and there is accelerated wear as wire is pushed through the tip. A viable alternative to copper is grey cast iron. The graphite in grey cast iron ensures that the alloy is self-lubricating. Although certain grades of grey cast iron are machineable, a contact tip body of grey cast iron would be brittle and have a tendency to crack under tensile stress during the operation of inserting, for example a tight-fitting (preferably an interference fit) tungsten insert. Nevertheless grey cast iron can be used as an insert to replace the copper contact area in a composite tip. An example of such a combination would be a tip comprising a copper body with inserts of a heat treated silver steel, followed by grey cast iron, followed by machineable ceramic.

Figure 10:
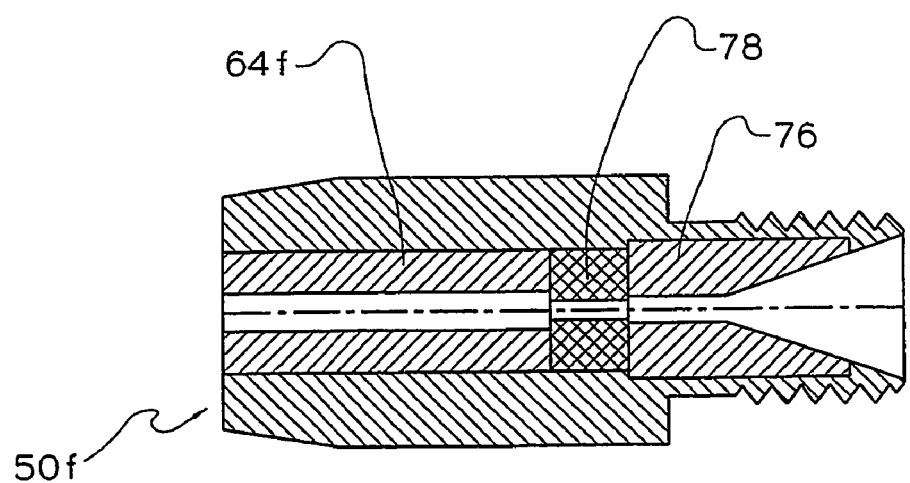

FIG. 10 shows a tip which is similar to tip 50e of FIG. 9 and, in this case, the references are as for FIG. 4 plus "f". In tip 50f of FIG. 9, an insert 78 is of cast iron instead of copper and insert 76 is of silver steel, while section 64f again comprises an insert of a machineable ceramic. After machining, insert 78 was heat treated to increase hardness and wear resistance.

It is important to appreciate that electrical contact resistance between a conductive insert and metal body of a tip must be minimised. For a contact resistance of 1 milli-ohm, for example, and a current of 300 A, the resistive heating in the contact area would be as high as 90 W. This would result in excessive heating of the tip leading to poor performance and reduced lifetime. It is therefore recommended that the fit between an insert and metal body of a tip be as tight (preferably an interference fit) as possible and that electrically conductive paste be used to fill any space between the outer surface of an insert and the inner mating surface of the metal body. This is especially critical if more than one insert is used as is the case in the tip 50f of FIG. 10. An alternative to electrically conductive paste is to braze or solder a conductive insert in the metal body of the tip and thereby ensure that any electrical resistance between the body of the tip and a conductive insert is very low. Although the examples given apply to wire consumables of diameter 1.2 mm, they may be readily applied for consumables of diameter greater or less than 1.2 mm. The primary requirements are to establish a well defined and compact current delivery area and to do so in a way that minimises the possibility of an open circuit condition. This latter requirement can be achieved by the use of pressure points. It can also be achieved by selecting suitable combinations of electrically conducting material pairs such that one member of such a pair has high resistance to sliding wear and the other member has a relatively low resistance to sliding wear. Stable electrical contact is achieved and maintained by the wire bedding into the material of relatively high wear with the overall wear rate and therefore tip lifetime controlled by the properties of the wear resistant member. The possibility of an open circuit can also be reduced by using a step change in the diameter of the bore in which the conducting region is made of a single material. In this case the wire beds into the material of the step thereby establishing a well defined current path of low resistance relative to other possible paths within the conducting part of the bore.

In industrial situations where, for example, it becomes necessary to weld downwards in a vertically down orientation of the torch, weld spatter is inevitable since current continuity from the consumable to the work piece is compromised by the downward flow of the weld pool. Spatter may therefore be created and may also adhere to the copper body of the tip and also to the exposed surface of the ceramic insert. Ultimately the spatter build up may form a continuous electrical path from the wire emerging from the tip to the copper body of the tip. This will lead to significant deterioration in the performance of the tip. Accordingly tip performance and lifetime may be improved by coating the external surface of the body of the tip with a refractory enamel material, such as a high temperature engine enamel, to reduce the adherence of spatter and to prevent an electrical path being formed connecting the wire emerging from the tip to the body of the tip. One alternative to coating with engine enamel is to spray the external surface of the body of the tip with an electrically insulating refractory material such as alumina. Another alternative is to nickel plate the external surface of the body of the tip since weld spatter is only weakly adherent to nickel coatings.

Figure 11:
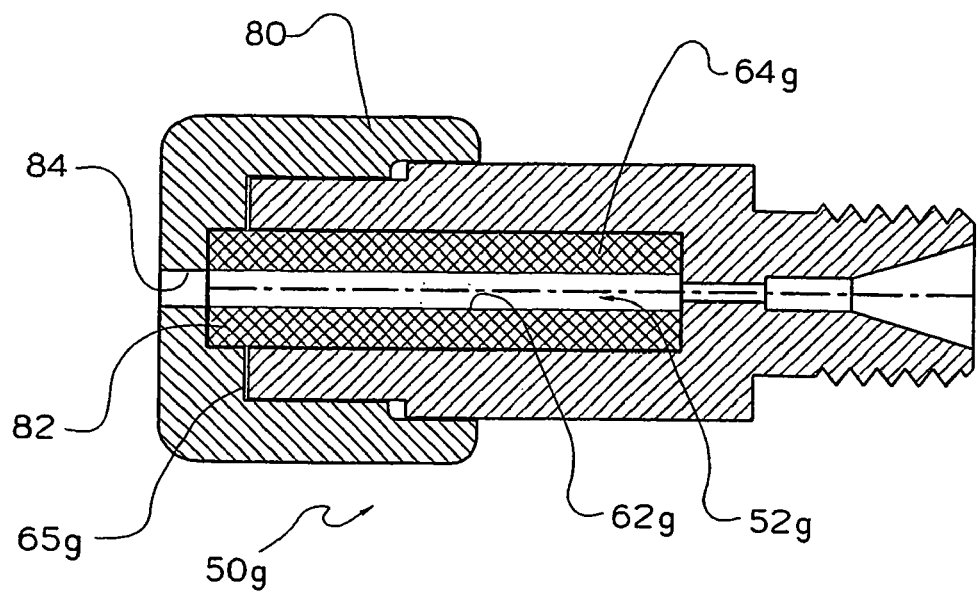

The problem of spatter build up may be addressed in another way. FIG. 11 shows a tip 50g with components corresponding to those of tip 50 of FIG. 4 having the same reference plus "g". The tip 50g includes modifications to the design of tips shown previously in FIGS. 4 to 10. These modifications are compatible with each of the tips shown in FIGS. 4 to 10. In effect, a ceramic cap 80 is screwed to the copper body at the outlet end 65g of the modified tip 50g to prevent a continuous build up of spatter from the bore 52g to the body of the tip. The preferred material for this type of cap 80 is a tough, dense ceramic material. The cap 80 reduces erosive wear of the end of the ceramic insert comprising section 64g. This erosive wear is due to exposure to intense radiation from the arc as well as impact from particles of spatter. In the modification shown in FIG. 11, the ceramic insert comprising section 64g of the tip 50g protrudes slightly beyond the outlet end of the copper body as shown at 82. The protrusion 82 prevents a gap due to erosive processes from forming between the inner face of the ceramic cap 80 and the end of the section 64g in the contact tip. In the absence of a gap it is not possible to create a continuous electrical path of condensed spatter particles extending from the wire in the bore to the body of the tip. The diameter of the bore 84 in the ceramic cap 80 may be in the range 0.5 to 1.0 mm greater than the diameter of the wire consumable and therefore less than or equal to the diameter of the bore section 62g within the ceramic insert comprising section 64g.

For clearances between wire consumable and the ceramic cap at the lower end of this range, the ceramic cap 80 would also serve to arrest burn back arising from for example instability in wire feed speed. As the electrode burns back during a momentary reduction in wire feed rate, the molten metal at the end of the electrode would be expected to solidify within the short length of bore 84 in the ceramic cap 80. Welding would cease since the tip 50fg would no longer be functional. However, by replacing the cap 80 with a new one, the tip 50fg could be readily repaired and the welding operation resumed.

The ceramic cap enables an additional modification to be made for relatively short tips. This is to omit the ceramic insert and use the cap not only to protect against spatter but to serve as a guide for the wire emerging from the tip.

Figure 12:
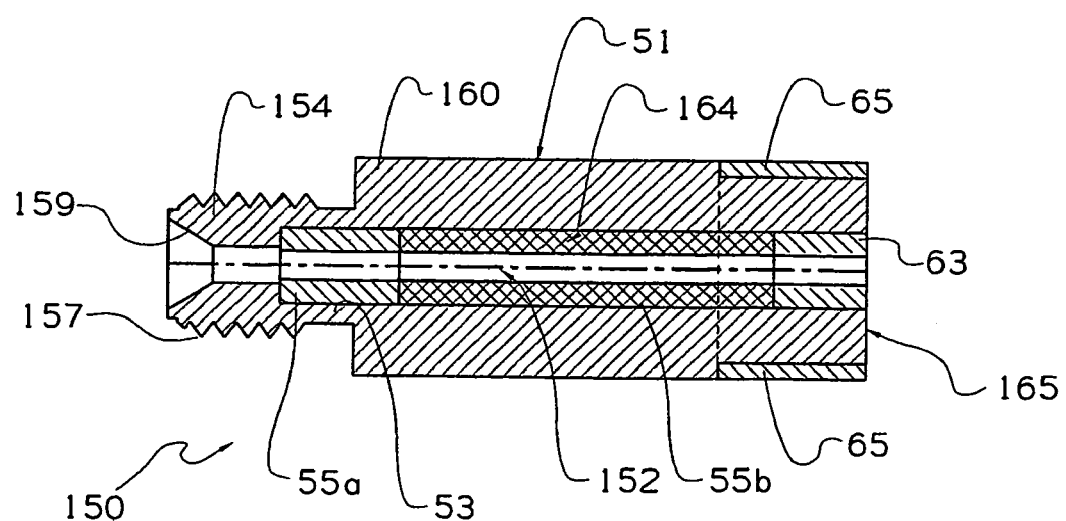

The principles outlined above for the contact tips of FIGS. 3 to 11 primarily relate to those tips for GMAW. However the principles may be also applied to SAW. FIG. 12 shows an example of a tip 150 suitable for SAW. The tip 150 is designed for use with wire 3.2 mm in diameter. As for GMAW, tip 150 enables a substantial reduction in heat input to be measured. For the equivalent copper tip operating at 500 A, the current for the same wire feed speed with an experimental tip corresponding to tip 150 was approximately 300 A.

With further reference to FIG. 12, parts of contact tip 150 corresponding to those of tip 50 of FIG. 4 have the same reference numeral plus 100. As shown, tip 150 has main body 51, of a copper alloy, which includes a threaded section 154 at its input end and a main section 160. The section 154 is externally threaded at 157 and defines a guide taper 159 which leads to a bore 152.

However, in this instance an inlet end section of bore 152 is defined within section 154.

As shown, the body 51 of the tip 150 is counterbored at 53 from end 165, along the full extent of section 160 and for a short distance into section 154. Tip 150 also includes a two-part section 164 comprising a tubular graphite insert 55a and a tubular ceramic insert 55b. As shown, insert 55a is shorter than the insert 55b, with section 164 overall slightly shorter than the length of the counter-bore 53 in body 51. The section 164 is fully received into the counter-bore 53 and an end section of the counter-bore has a cylindrical sleeve of ceramic cement 63 provided therein. Thus, over all, from taper 159 to end 165, bore 152 is defined by section 154 of copper alloy, graphite insert 55a and the ceramic insert 55b, with ceramic cement insert 63 providing a continuation of bore 152 to end 165. Also, as shown, a refractory sleeve 65 is provided around the outlet end of body 51 to protect against arcing through the flux in a submerged arc process.

In FIG. 12, the bore 152 is 3.4 mm in diameter, with graphite insert 55a and ceramic insert 55b each having an external diameter of 9.5 mm. The tip is intended for a consumable of 3.2 mm diameter.

The principle of providing a primary contact point within the bore 152, as for example described for the graphite tip of FIG. 3 with reference to means 40, may also be applied to the high current composite tip of FIG. 12. One contact area is in the copper body 51 at the inlet end of the bore 152. A second contact area is in the graphite insert 55a, at the inlet end of the insert 55a. Although the efficiency of current transfer would be reduced by the higher resistivity of graphite relative to copper, this is offset by the greater contact area between wire and graphite insert. This contact between graphite and wire is further improved by a reduction in the bore diameter of the graphite of approximately 0.1 mm. This reduction of 0.1 mm is greater than that used in for example FIGS. 9 and 10 but is approximately in proportion to the diameter of the consumable. The two current contact areas are adjacent and would in effect operate at the same potential and both be equivalent to normally closed electrical contacts. The effective current delivery point would be in the immediate vicinity of the junction between the copper part of the bore and the inlet end of the graphite insert. In a variant of the arrangement of FIG. 12, in which guide taper 159 extends through to a relocated inlet end of bore 152 at the nearer end of insert 55a, means 40 as in FIG. 3 would be provided in insert 55a, adjacent to the inlet of bore 152.

Figure 13:
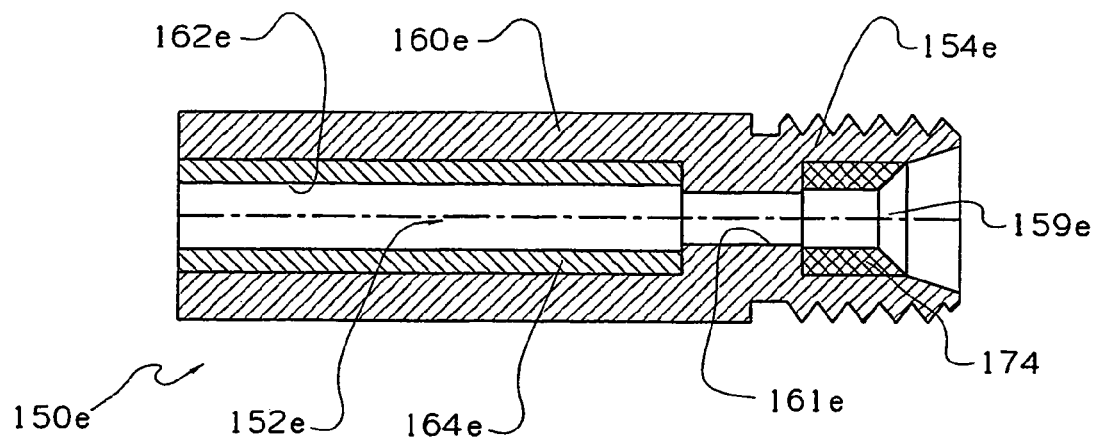

FIG. 13 shows a further contact tip which, as indicated later herein, was used in the welding procedure described with reference to FIGS. 19 and 21. The tip of FIG. 13 is similar in overall form to tip 50e of FIG. 9. Corresponding parts for the tip of FIG. 13 therefore have the same reference numerals as FIG. 9, plus 100.

Figure 19:
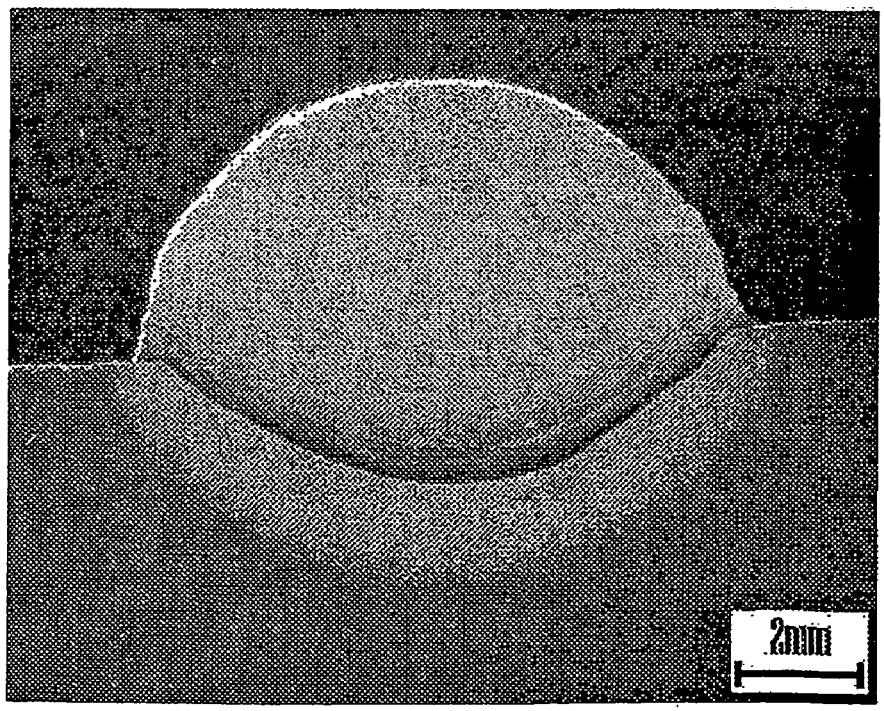

While the tip 50e of FIG. 9 was for use with 1.2 mm diameter consumable wire, tip 150e of FIG. 13 was for use with 2.8 mm hardfacing wire with which the bead on plate weld of FIG. 19 was produced. Tip 150e has an overall length of 45 mm. Integrally formed sections 154e and 160e are of a copper alloy, while the insert comprising section 164e is of a machineable ceramic. The insert 174 is of silver steel which, in this case, was not heat treated after machining. The bore part 161e has a diameter of 3.1 mm in insert 174, reducing to 3.0 mm in the extent of part 161e defined by copper alloy between insert 174 and the insert of section 164e. The part 162e of bore 152e has a diameter of 3.8 mm.

The taper 159e of insert 174 guides the electrode wire into bore 152e. Part 161e of bore 152e has a lesser diameter where defined by copper alloy than by insert 174. Also insert 174 has a lower level of electrical conductivity than the copper alloy. Due to these factors, the electrode wire makes principal electrical contact with the copper alloy. At the junction between the copper alloy and ceramic insert 164e, the diameter of bore 152e increases in the insert, causing the location of principal contact to be adjacent insert 164e. The ceramic of which insert 164e is made has a relatively low level of electrical conductivity, thereby precluding any secondary contact therein which is able to short circuit the principal contact.

Figure 14:
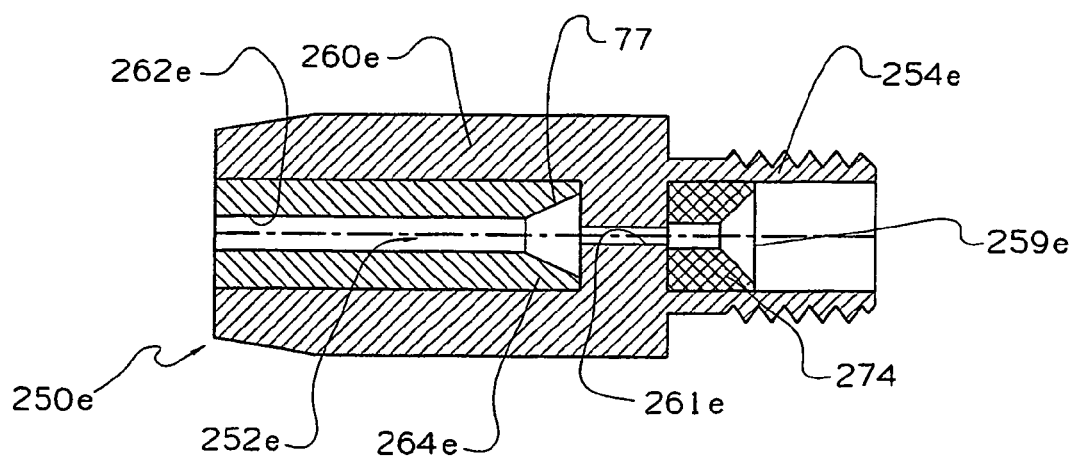

Feedability of the wire consumable is an issue not only with respect to the bore of a tip but also in the ceramic guide. Accordingly a ceramic insert with a tapered inlet end was made and installed in a tip of the type shown in FIG. 9 except that in this particular case the metallic insert was of silver steel instead of tungsten. The tip was successfully trialled with a pulsed MIG power source. Details of the tip are given in FIG. 14 which shows another contact tip which is similar to tip 150e of FIG. 9. Corresponding parts of the tip of FIG. 14 have the same reference numerals as used in FIG. 9 plus 200.

Tip 250e has an overall length of 36 mm, with a spacing of 5 mm between insert 274 and the section 264e. The diameter of bore 252e is 1.3 mm in the extent of length 261e defined by insert 274, 1.25 mm in the extent of length 261e defined by copper alloy and 2.0 mm in the extent 262e defined by the insert of section 264e. In addition to different dimensions, tip 250e differs from tip 150e of FIG. 9 in a further feature. As shown, the ceramic insert of section 264e has a frusto-conical inlet 77 which is similar to taper 259e of insert 274. The inlet 77 tapers down to the 2.0 mm diameter of bore 252e in section 264e. The provision of tapered inlet 77 is believed to facilitate wire feedability.

Figure 15:
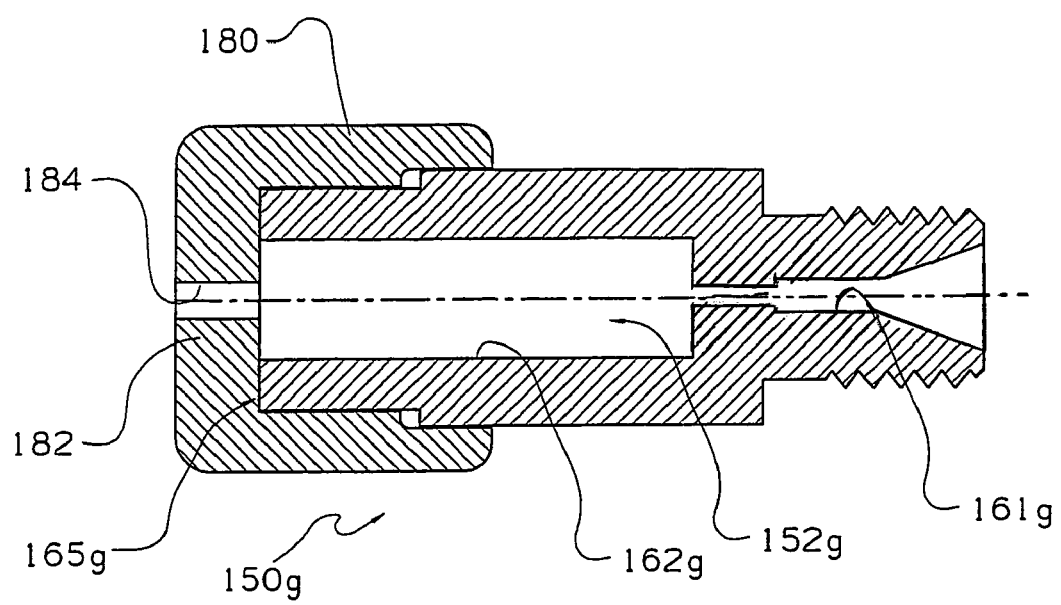

In each of the embodiments of the invention, short circuiting of the primary electrical contact is prevented by that contact establishing a dominant current supply path. That is, secondary contact is possible but not at the low level of contact resistance applicable to the primary electrical contact. This difference in contact resistance is increased in some instances by choice of materials to define primary contact region of the bore and the remainder of the bore, as well as by the remainder of the bore having a slightly larger diameter than that region. FIG. 15 shows an alternative form of contact tip 150g. This is based on part of tip 50g of FIG. 11, and corresponding parts therefore have the same reference numeral, plus 100.

The details of contact tip 150g will in part be understood from the description of tip 50g of FIG. 9. Thus, primary electrical contact is established in bore section 161g in the same way as for contact tip 50g. However, rather than ensuring that secondary contact in bore section 162g does not short circuit that primary contact, secondary contact is precluded. Thus, bore section 162g has a diameter sufficiently in excess of the diameter of section 161gas to preclude secondary contact. Rather, an electrode wire fed through tip 150g passes axially through bore 162g and is guided by guide hole 184 in end wall 182 of insulating end cap 180.

Although welding of ferrous metals represents the major activity in welding in industry, welding of non-ferrous materials, particularly aluminium, is assuming increasing importance. Aluminium has low electrical resistivity, high thermal conductivity and, relative to steel and stainless steel consumables, is very soft and therefore difficult to feed. Indeed it may be so difficult to feed that special torches are generally required to weld aluminium. These are referred to as push-pull guns and are characterised by two feed mechanisms, one at the spool end to push wire into the torch liner, the other near the tip to pull the wire through the liner and then push the wire through the tip. The clearance between the wire and bore of the tip is larger than for ferrous consumables to accommodate irregularities such as kinks in the wire. As for ferrous consumables, the wire melting rate for aluminium is given by:

$W = aI + bLI^2$.

However, because the electrical resistivity of aluminium is so low, the resistive heating term $bLI^2$ is in effect negligible. It would appear therefore that there would no benefit in welding aluminium with a contact tip according to the invention. Experimentally it is found that this is not the case. The combination of improved feedability and corresponding arc stability leads to a reduction in current, for constant wire feed speed. For an aluminium alloy consumable of grade 4043 and 1.2 mm in diameter, a typical current required to achieve a wire melting rate of 8 m/minute is 180 A for a traditional copper tip. This may be reduced by approximately 10 A with a tip of the type shown in FIG. 9.

The invention further provides a consumable electrode feed system suitable for electric arc welding using a consumable electrode, as well as also providing each of an electric arc welding gun and electric arc welding apparatus having the feed system, wherein the feed system includes means for holding a supply of a wire or strip to comprise a consumable electrode for electric arc welding, a conduit through which the wire or strip is able to pass from an inlet end and through an outlet end of the conduit, and feed means operable to draw the wire or strip from the holding means for movement longitudinally through the conduit, wherein the feed system further includes a contact tip according to the present invention, with the contact tip mounted relative to the outlet end of the conduit to enable the wire or strip to pass through the bore of the contact tip.

Apart from the contact tip, the feed system of the invention may be similar to that used in conventional electric arc welding using a consumable electrode. Thus, the holding means may be a spool for holding a coil of consumable wire or strip, while the feeding means may be a power driven roller system operable in response to a control system to draw the consumable from the spool and feed it through the conduit and contact tip. The conduit may be metal or polymer while the contact tip preferably is mounted in the contact tip holder at the outlet end of the conduit.

In welding apparatus having the feed system according to the invention, the power supply for operation of a control system for the consumable feed means, and also for providing welding current, may be similar to that used in conventional electric arc welding apparatus adapted for welding with a consumable electrode. However, as indicated above, the contact tip of the invention enables a smoother consumable feeding process and reduction in the current requirements for welding.

In a tip according to the present invention, the wire does not adhere to the tip. Current is supplied at or near the inlet end and is then able to preheat the wire as it travels through the tip. The lack of adhesion between wire and tip makes it less probable for a parallel current path to be established within the tip. Such a current would reduce the effectiveness of the preheat mechanism. It is experimentally observed that, for tips described in this document, most if not all of the maximum preheat is attained for ferrous consumables. For higher currents, this preheat mechanism is dominant. Resistive heating is more controlled and therefore stable than heating by the electric arc. Accordingly fume and spatter levels are reduced. For aluminium, the resistivity of the consumable is so low that any preheat is minimal. Nevertheless improved feedability associated with these new tips is capable of achieving a small but measurable reduction in heat input.

In general, weld metal deposition rate (for a given current level) may be enhanced by constructing the contact tip of the invention in a form which increases the effective electrode extension. Existing designs may be substantially improved in a variety of ways designed to optimise the benefits provided by the contact tip of the present invention. For example, the contact tip may be of an extended one piece form with a bore machined so as to ensure continuous electrical contact between the contact tip and the consumable at the inlet end of the bore, with the bore having a slightly larger cross-section for its remaining length. The remaining length would act as a guide for the consumable, which then would be substantially heated before emerging from the contact tip into the arc. For a given current, this would enable higher deposition rates. Alternatively, for a given consumable melting rate, lower energy input by resistance heating would be attainable.

Figure 16:
FIG. 16 is a photomacrograph of a bead on plate weld produced with use of a contact tip according to the present invention.
Figure 17:
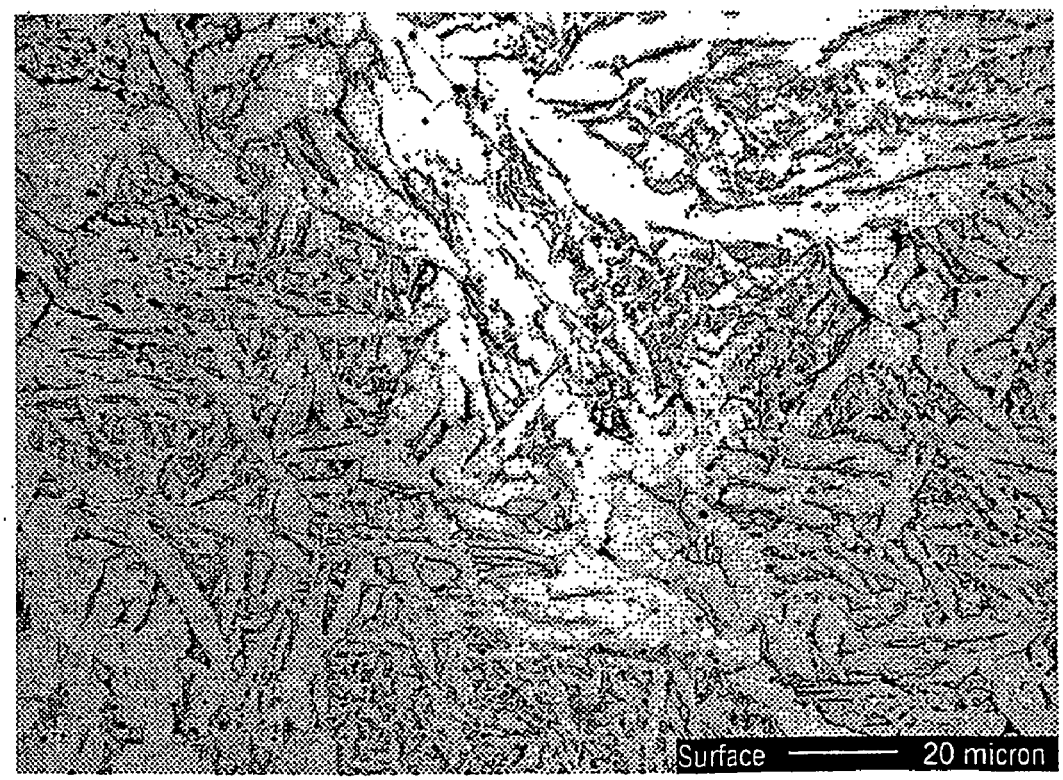
FIG. 17 is a photomicrograph of the bead of FIG. 16.

With reference to FIG. 16, there is shown a photomacrograph of a bead on plate weld, produced using a contact tip similar to tip 50e of FIG. 9. However, instead of a tungsten insert 74, there was used a similar insert of silver steel. The length of bore 61e in the steel insert was 6 mm and, in the adjacent copper alloy part of length 61e, it was 5 mm. The welding parameters used in producing the weld of FIG. 15 are set out in Table 2. FIG. 17 is a photomicrograph taken from a region close to the top of the weld bead of FIG. 16.

TABLE 2

Welding parameters for a high deposition rate bead on plate weld

| | |
|---|---|
| Type of weld | High deposition rate bead on plate |
| Consumable | Copper-coated steel wire, ES6 |
| Wire diameter | 1.2 mm |
| Substrate material | Mild steel |
| Substrate thickness | 20 mm |
| Shielding gas | 5% carbon dioxide, 3% oxygen, and balance argon |
| Welding position | Down hand |
| Voltage | 39 V |
| Current | 410 A |
| Polarity | DCEP |
| Power source | Constant voltage, inverter |
| Stand-off | 20 mm |
| Wire feed speed | 27.5 metres per minute |
| Deposition rate | 14.3 kg per hour |
| Travel speed | 400 mm per minute |
| Heat input | 24 kJ/cm |

As is apparent from FIGS. 16 and 17, the weld shown is of high quality. This is despite it having been produced at a very high deposition rate, using a very high wire feed speed, but yet with reduced heat input compared with current practice using a conventional copper alloy contact tip. A high quality essentially spatter free weld is not capable of being produced with a conventional GMAW process with copper alloy tip for the wire feed speed given in Table 2. There is complete fusion between the weld bead and substrate, the heat affected zone is narrow and the microstructure is generally homogeneous. The microstructure of the weld bead shows various forms of ferrite including acicular ferrite which is beneficial to impact toughness. There is no evidence of porosity either in the macrograph or the micrograph.

Figure 18:
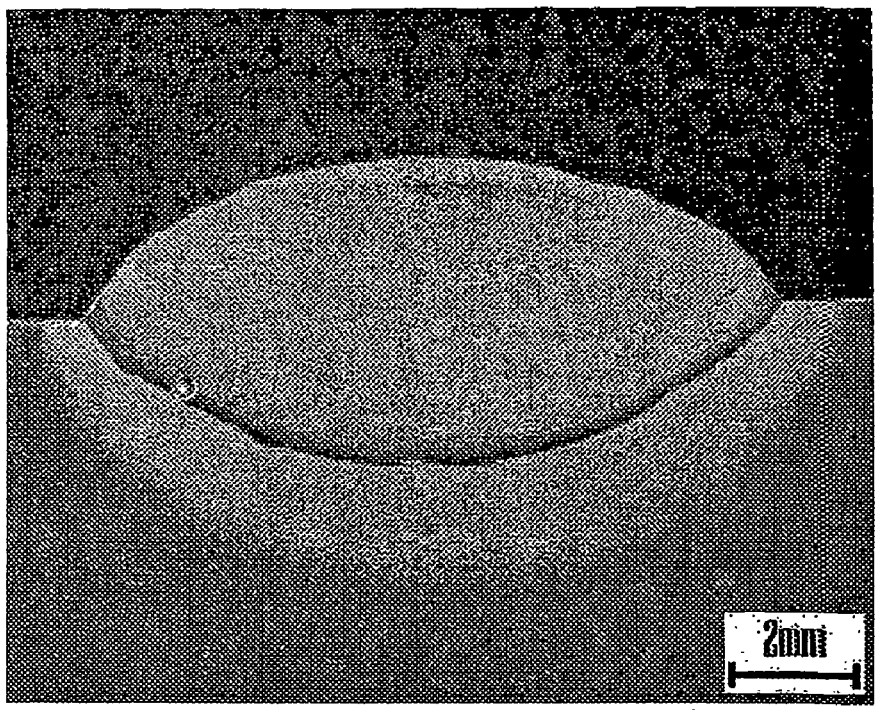
FIGS. 18 and 19 show photomacrographs illustrating FCAW deposited bead on plate welds, using a conventional contact tip and one according to the present invention, respectively.

FIGS. 18 and 19 are photomacrographs of two further bead on plate welds, but produced by FCAW. FIG. 18 shows a bead deposited by current practice using a conventional copper alloy contact tip. FIG. 19 shows a bead deposited using a contact tip in accordance with the tip of FIG. 13. The operating parameters are set out in Table 3.

TABLE 3

Welding parameters for bead on plate welds deposited using FCAW (flux cored arc welding)

| | Prior Art | Present Invention |
|---|---|---|
| Type of weld | Bead on plate | Bead on plate |
| Consumable | High carbon high chromium white iron | High carbon high chromium white iron |
| Wire diameter | 2.8 mm | 2.8 mm |
| Substrate material | Mild steel | Mild steel |
| Substrate thickness | 10 mm | 10 mm |
| Shielding gas | None i.e. open arc | None i.e. open arc |
| Welding position | Down hand | Down hand |
| Voltage | 28.5 V | 28.5 V |
| Current | 410 A | 390 A |
| Polarity | DCEP | DCEP |
| Power source | Constant voltage, DC rectifier | Constant voltage, DC rectifier |
| Stand-off | 20 mm | 20 mm |
| Wire feed speed | 3.3 metres per minute | 5.1 metres per minute |
| Deposition rate | 7.5 kg per hour | 11.6 kg per hour |
| Travel speed | 800 mm per minute | 800 mm per minute |
| Heat input | 8.8 kJ/cm | 8.3 kJ/cm |

Figure 20:
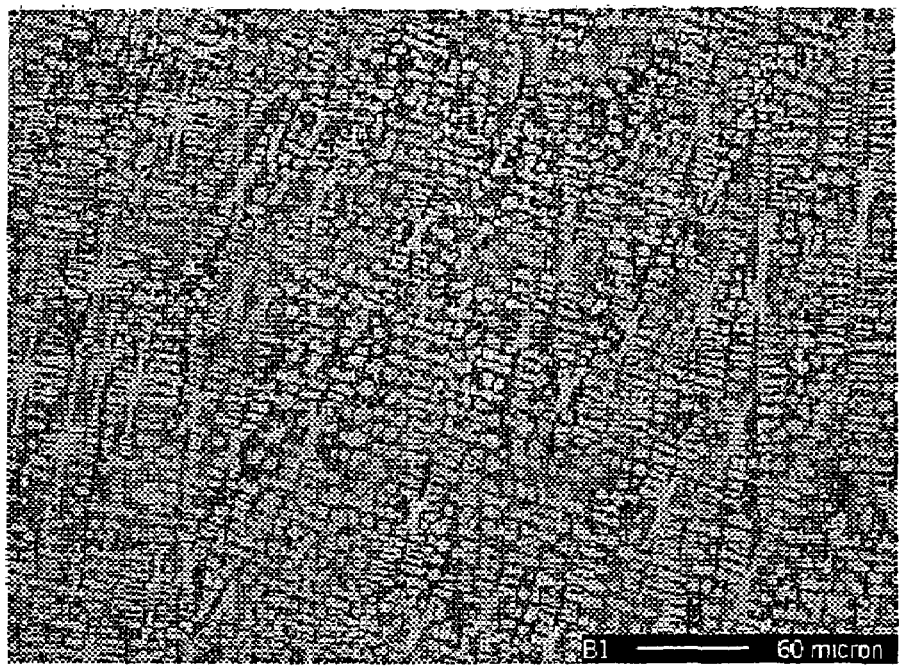
FIGS. 20 and 21 show photomicrographs of the deposits of FIGS. 18 and 19, respectively.
Figure 21:
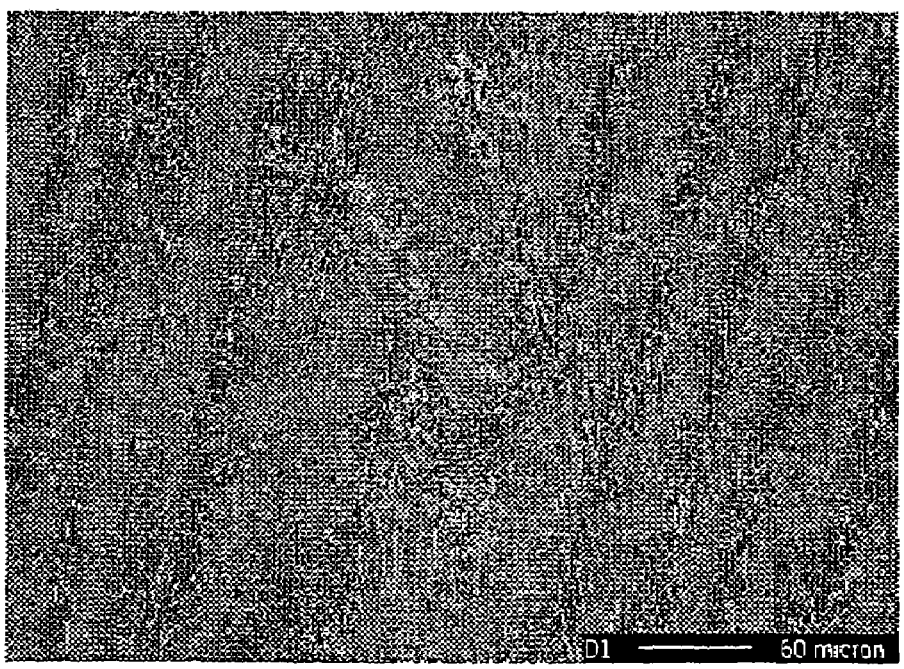

FIGS. 20 and 21 are photomicrographs taken from the weld bead of FIG. 18 and 19, respectively. FIG. 20 shows the white iron consumable has been diluted with material from the steel substrate. The dilution is sufficient to render the microstructure hypoeutectic, with key features of the microstructure being dendrites of austenite in a matrix of eutectic. In contrast, FIG. 21 shows that, while the white iron consumable has been diluted with substrate material, the dilution is substantially less than shown in FIG. 20. Thus, in FIG. 21, the microstructure is eutectic to hypereutectic rather than hypoeutectic. The photomicrographs of FIGS. 20 and 21 were taken from a similar location in the respective bead, namely the centre of the bead on plate welds.

Reverting to Table 3 and FIGS. 18 and 19, it will be noted that the deposit of FIG. 19 has a height above the plate surface which is about 75% greater than the corresponding height obtained with the bead of FIG. 18. The width of the bead of FIG. 19 is about 15% less than the width of the bead of FIG. 18 but, as is evident from the deposition rate at the same travel speed, the contact tip and parameters for FIG. 19 achieved about a 55% increase in the weight of deposited weld metal compared with FIG. 18. This is with a modest reduction in both the current level required and the heat input. Overall, FIG. 19 and Table 2 highlight very significant practical benefits in hard-facing with use of the present invention compared with current practice.

Figure 22:
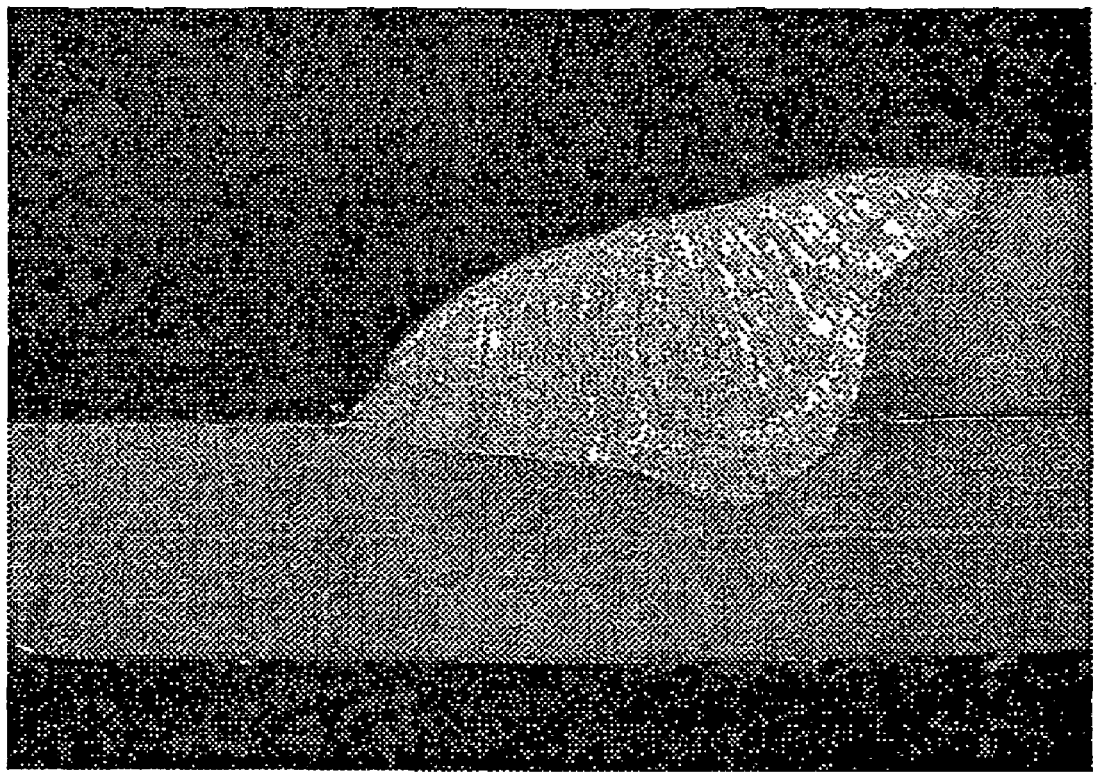
FIG. 22 shows a lap weld produced using a contact tip according to the present invention.

FIG. 22 is a photomacrograph of a lap weld produced by the present invention. The welding tip used was the same as described in FIG. 9 The welding parameters are set out in Table 4. There is complete fusion of the weld bead to both steel sheets, adequate and not excessive penetration along the fusion line and a narrow heat affected zone. There is no evidence of porosity.

TABLE 4

Welding parameters for a high productivity lap weld

| | |
|---|---|
| Type of weld | High productivity lap weld |
| Consumable | Copper-coated steel wire, ES6 |
| Wire diameter | 1.2 mm |
| Substrate material | Mild steel |
| Substrate thickness | 3 mm |
| Shielding gas | 18% carbon dioxide, balance argon |
| Welding position | 20 degrees vertical down |
| Voltage | 34.5 V |
| Current | 320 A |
| Polarity | DCEP |
| Power source | Constant voltage, inverter |
| Stand-off | 20 mm |
| Wire feed speed | 15 metres per minute |
| Deposition rate | 7.9 kg per hour |
| Travel speed | 1800 mm per minute |
| Heat input | 3.7 kJ/cm |

One of the prerequisites for assessing the suitability of a new welding procedure is to produce a welded test plate and to analyse the mechanical properties of the weld metal. Thus, to further evaluate the present invention, a welded test plate was produced. For this, a single-V-groove or butt weld was produced between respective bevelled edges of two plates supported on a backing bar. Each plate was 20 mm thick low carbon steel plate, the backing plate was 10 mm thick, the root gap between the plates was 12 mm, while the included angle between the plate edges was 45°. The weld was produced using a contact tip in accordance with FIG. 9, with the welding parameters as detailed in Table 5.

TABLE 5

Welding parameters for Test Plate

| | |
|---|---|
| Consumable | ES6 copper-coated steel wire |
| Wire diameter | 1.2 mm |
| Plate material | 20 mm low carbon steel |
| Backing plate | 10 mm low carbon steel |
| Shielding gas | Commercial $CO_2/O_2$/Ar mix |
| Voltage | 41.5 V |
| Current | 430 A |
| Polarity | DC Electrode positive |
| Power source | Constant voltage, MIG |
| Stand-off | 20 mm |
| Wire feed speed | 27.5 metres per minute |
| Deposition rate | 14.2 kg per hour |
| Travel speed | 400 mm per minute |
| Inter-pass temperature | 160° C. max. |
| Heat Input | 26.8 kJ/cm |

Impact and tensile test samples were cut from the completed weld deposit in accordance with the guidelines set out in ANSI/AWS A5.20-95 (American National Standards Institute/American Welding Society). The results of mechanical testing are set out in Tables 6 and 7.

TABLE 6

Mechanical Properties of Test Plate Weld Metal

| | |
|---|---|
| UTS | 543 MPa |
| 0.2% Proof | 421 MPa |
| Elongation | 28% |
| Impact strength at –20° C. | 133 J, 121 J, 118 J |
| Impact strength at –40° C. | 105 J, 99 J, 92 J |
| Impact strength at –60° C. | 69 J, 67 J, 37 J |

TABLE 7

Hardness of Test Plate Weld

| | Traverse 1 (HV10) | Traverse 2 (HV10) | Traverse 3 (HV10) |
|---|---|---|---|
| Parent material, min | 159 | 162 | 164 |
| Parent material, max | 168 | 164 | 166 |
| HAZ, min | 169 | 160 | 163 |
| HAZ, max | 202 | 179 | 197 |
| Weld, min | 165 | 171 | 173 |
| Weld, max | 196 | 186 | 206 |

The properties detailed in Table 6 show the weld metal to have excellent ultimate tensile strength, elongation and impact strength toughness. The values for impact strength indicate that the weld is stable at temperatures down to –40° C. The spread of values at –60° C. suggest that this temperature is near a transition temperature and that a phase transformation is imminent.

In relation to FIG. 7, the Vickers hardness (HV10) survey was of each of the low carbon steel plate parent metal, the heat affected zone (HAZ) of the parent metal and the weld metal. The hardness values were obtained along three traverses. The hardness values for the HAZ and weld metal are consistent with the toughness of the weld metal shown in Table 6.

The chemical analysis of the weld metal is shown in Table 8. The concentrations of silicon and manganese indicate there was minimal element loss.

TABLE 8

Chemical Analysis of Test Plate Weld Metal.

| Element | Weld composition (%) |
|---|---|
| Fe | Balance |
| C | 0.05 |
| Mn | 1.2 |
| Si | 0.67 |
| P | 0.014 |
| Ni | 0.009 |
| Cr | 0.02 |
| Mo | 0.03 |
| Cu | 0.01 |
| V | 0.15 |
| Nb | <0.01 |
| Ti | <0.01 |
| Al | <0.005 |
| B | <0.0005 |

Finally, it is to be understood that various alterations, modifications and/or additions may be introduced into the constructions and arrangements of parts previously described without departing from the spirit or ambit of the invention.

The invention claimed is:

1. In a combination of a contact tip and a consumable electrode for electric arc welding in which the contact tip has a body defining a bore having a length between an inlet end and an outlet end for the consumable electrode to pass through the bore, wherein the improvements comprise:
the bore, in succession in a direction from the inlet end to the outlet end, having a first longitudinal section, a second longitudinal section and a third longitudinal section;
the bore having a smaller diameter in the second longitudinal section than in the first longitudinal section to define at adjacent ends of the first and second longitudinal sections a circumferential step facing towards the inlet end;
differences in diameters of the first and second longitudinal sections of the bore and hence the size of the step such that the consumable electrode is able to pass through each of the first and second longitudinal sections with a respective clearance each enabling electrical contact between the consumable electrode and the body, and such that the consumable electrode is able to bed into the body at the step thereby to establish in the second longitudinal section a primary contact region of the bore at which electric current from a welding power supply is transferred to the consumable electrode from the body; and
the bore in the third longitudinal section having an increased diameter, relative to the diameters in the first and second longitudinal sections, for precluding between the body and the consumable electrode secondary contact in the third longitudinal section effective to substantially short circuit primary electrical contact in the primary contact region.

2. The combination of a contact tip and a consumable electrode according to claim 1, wherein the primary contact region is a minor part of the length of the bore.

3. The combination of a contact tip and a consumable electrode according to claim 2, wherein the primary contact region is less than 10% of the length of the bore.

4. The combination of a contact tip and a consumable electrode according to claim 3, wherein the primary contact region is less than 5% of the length of the bore.

5. The combination of a contact tip and a consumable electrode according to claim 1, wherein the primary contact region is not more than about 5 mm in length.

6. The combination of a contact tip and a consumable electrode according to claim 5, wherein the primary contact region is less than about 3 mm in length.

7. The combination of a contact tip and a consumable electrode according to claim 1, wherein the primary contact region is at or close to the inlet end of the bore.

8. The combination of a contact tip and a consumable electrode according to claim 7, wherein the body defines a tapered guide leading to the inlet end of the bore.

9. The combination of a contact tip and a consumable electrode according to claim 1, wherein the slight step is provided by counter-boring from the inlet end.

10. The combination of a contact tip and a consumable electrode according to claim 1, wherein the slight step is provided by the tip including at least one insert which defines a portion of the bore with the portion differing appropriately in diameter from an adjacent portion.

11. The combination of a contact tip and a consumable electrode according to claim 1, wherein the slight step is within a section of the bore defined by a single material.

12. The combination of a contact tip and a consumable electrode according to claim 11, wherein the single material is selected from copper, copper alloy or a hardenable steel.

13. The combination of a contact tip and a consumable electrode according to claim 1, wherein the bore is defined at the inlet end side of the step by a first material which is relatively harder than a second material defining the bore at the outlet end side of the step.

14. The combination of a contact tip and a consumable electrode according to claim 13, wherein the first material is a copper alloy and the second material is graphite.

15. The combination of a contact tip and a consumable electrode according to claim 13, wherein the first material is sintered tungsten and the second material is copper alloy.

16. The combination of a contact tip and a consumable electrode according to claim 13, wherein the first material is steel and the second material is copper alloy.

17. In a combination of a contact tip and a consumable electrode for electric arc welding in which the contact tip has a body defining a bore having a length between an inlet end and an outlet end for the consumable electrode to pass through the bore, wherein the improvements comprise the bore, in succession in a direction from the inlet end to the outlet end, having a first longitudinal section, a second longitudinal section and a third longitudinal section;

the bore having a smaller diameter in the second longitudinal section than in the first longitudinal section to define at adjacent ends of the first and second longitudinal sections a circumferential step facing towards the inlet end;

differences in diameters of the first and second longitudinal sections of the bore and hence the size of the step are such that the consumable electrode is able to pass through each of the first and second longitudinal sections with a respective clearance each enabling electrical contact between the consumable electrode and the body, and such that the consumable electrode is able to bed into the body at the step thereby to establish in the second longitudinal section a primary contact region of the bore at which electric current from a welding power supply is transferred to the consumable electrode from the body; and the bore in the third longitudinal section being defined by a material which differs from and has a lower electrical conductivity than material defining the bore in the first and second longitudinal sections whereby to preclude between the body and the consumable electrode contact in the third longitudinal section effective to substantially short circuit primary electrical contact in the primary contact zone.

18. The combination of a contact tip and a consumable electrode according to claim 17, wherein the material defining the length of the bore from the primary contact region is electrically insulating.

19. The combination of a contact tip and a consumable electrode according to claim 17, wherein the primary contact region is a minor part of the length of the bore.

20. The combination of a contact tip and a consumable electrode according to claim 19, wherein the primary contact region is less than 10% of the length of the bore.

21. The combination of a contact tip and a consumable electrode according to claim 20, wherein the primary contact region is less than 5% of the length of the bore.

22. The combination of a contact tip and a consumable electrode according to claim 17, wherein the primary contact region is not more than about 5 mm in length.

23. The combination of a contact tip and a consumable electrode according to claim 22, wherein the primary contact region is less than about 3 mm in length.

24. The combination of a contact tip and a consumable electrode according to claim 17, wherein the primary contact region is at or close to the inlet end of the bore.

25. The combination of a contact tip and a consumable electrode according to claim 24, wherein the body defines a tapered guide leading to the inlet end of the bore.

26. The combination of a contact tip and a consumable electrode according to claim 17, wherein the slight step is provided by counter-boring from the inlet end.

27. The combination of a contact tip and a consumable electrode according to claim 17, wherein the slight step is provided by the tip including at least one insert which defines a portion of the bore with the portion differing appropriately in diameter from an adjacent portion.

28. The combination of a contact tip and a consumable electrode according to claim 17, wherein the slight step is within a section of the bore defined by a single material.

29. The combination of a contact tip and a consumable electrode according to claim 28, wherein the single material is selected from copper, copper alloy or a hardenable steel.

30. The combination of a contact tip and a consumable electrode according to claim 17, wherein the bore is defined at the inlet end side of the step by a first material which is relatively harder than a second material defining the bore at the outlet end side of the step.

31. The combination of a contact tip and a consumable electrode according to claim 30, wherein the first material is a copper alloy and the second material is graphite.

32. The combination of a contact tip and a consumable electrode according to claim 30, wherein the first material is sintered tungsten and the second material is copper alloy.

33. The combination of a contact tip and a consumable electrode according to claim 30, wherein the first material is steel and the second material is copper alloy.

* * * * *